(12) United States Patent
Lee

(10) Patent No.: US 7,956,942 B2
(45) Date of Patent: Jun. 7, 2011

(54) LIQUID CRYSTAL DISPLAY AND METHOD THEREOF

(75) Inventor: Min-Cheol Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 961 days.

(21) Appl. No.: 11/445,412

(22) Filed: Jun. 1, 2006

(65) Prior Publication Data

US 2006/0274009 A1     Dec. 7, 2006

(30) Foreign Application Priority Data

Jun. 1, 2005    (KR) .................. 10-2005-0046911

(51) Int. Cl.
G02F 1/1343    (2006.01)
(52) U.S. Cl. ........................... 349/38; 349/39
(58) Field of Classification Search .............. None
See application file for complete search history.

(56) References Cited

U.S. PATENT DOCUMENTS

| | | | | |
|---|---|---|---|---|
| 5,610,739 | A * | 3/1997 | Uno et al. ................. | 349/39 |
| 5,852,485 | A * | 12/1998 | Shimada et al. ........... | 349/141 |
| 6,028,581 | A | 2/2000 | Umeya ...................... | 345/104 |
| 6,411,346 | B1 * | 6/2002 | Numano et al. ........... | 349/39 |
| 2005/0122441 | A1 * | 6/2005 | Shimoshikiryoh .......... | 349/38 |

FOREIGN PATENT DOCUMENTS

| | | |
|---|---|---|
| JP | 5-333376 | 12/1993 |
| JP | 8-179341 | 7/1996 |
| JP | 9-189922 | 7/1997 |
| JP | 2002-333870 | 11/2002 |
| JP | 2004-145266 | 5/2004 |
| JP | 2004-213011 | 7/2004 |
| JP | 2004-258598 | 9/2004 |
| JP | 2004-272259 | 9/2004 |
| KR | 10-2004-0062752 | 7/2004 |
| KR | 10-2004-0084019 | 10/2004 |
| KR | 10-2004-0105934 | 12/2004 |
| KR | 10-2005-0018520 | 2/2005 |
| WO | 2004086129 | 10/2004 |

* cited by examiner

*Primary Examiner* — Lucy P Chien
(74) *Attorney, Agent, or Firm* — Cantor Colburn LLP

(57) ABSTRACT

A liquid crystal display includes a first gate electrode, a storage electrode having a body and an extension, a first semiconductor formed on a gate insulating layer, a first drain electrode formed on the first semiconductor, separated from a first source electrode, and having an end portion overlapping the first gate electrode, and an expansion overlapping the body of the storage electrode and distanced from the end portion with a connection connecting the end portion and the expansion and overlapping the extension of the storage electrode, a passivation layer having a contact hole exposing the expansion of the first drain electrode, and a first field-generating electrode connected to the first drain electrode through the contact hole.

21 Claims, 19 Drawing Sheets

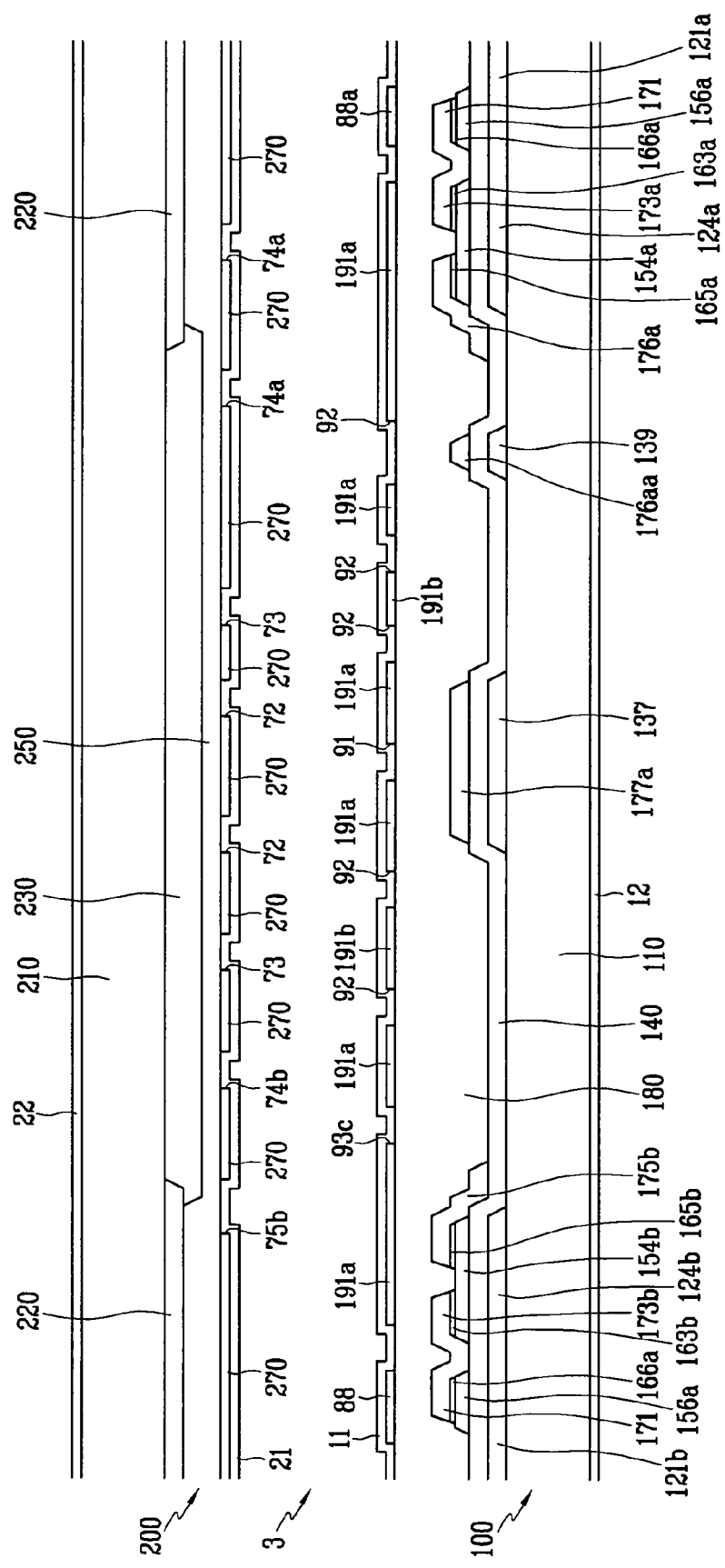

LIQUID CRYSTAL DISPLAY AND METHOD THEREOF

This application claims priority to Korean Patent Application No. 10-2005-0046911, filed on Jun. 1, 2005 and all the benefits accruing therefrom under 35 U.S.C. §119, and the contents of which in its entirety are herein incorporated by reference.

BACKGROUND OF THE INVENTION (a) Field of the Invention

The present invention relates to a liquid crystal display ("LCD") and method thereof. More particularly, the present invention relates to an LCD improving lateral visibility, and a method of improving a display of the LCD.

(b) Description of the Related Art

A liquid crystal display ("LCD") is widely used as flat panel display including two panels provided with field-generating electrodes, such as pixel and common electrodes, and a liquid crystal ("LC") layer interposed there between. The LCD generates an electric field in the LC layer by applying voltages to the field-generating electrodes, and aligns the LC molecules of the LC layer to control the polarization of light incident thereto, thereby displaying the desired images.

In a vertically aligned ("VA") mode LCD, the directors of LC molecules are aligned vertically with respect to the upper and lower panels with no application of an electric field, as it gives a high contrast ratio and a wide reference viewing angle. The reference viewing angle refers to a viewing angle with a contrast ratio of 1:10, or an inter-gray luminance inversion limit angle.

With the VA mode LCD, cutouts or protrusions may be formed at the field-generating electrodes to realize a wide viewing angle. As the direction of the LC molecules to be inclined is determined by way of the cutouts or protrusions, the inclination directions of the LC molecules can be diversified, thereby widening the reference viewing angle.

However, the VA mode LCD involves poor visibility at the lateral side thereof, compared to the visibility at the front side thereof. For example, with the case of a patterned vertically aligned ("PVA") mode LCD having cutouts, the luminance thereof is heightened as it comes to the lateral side thereof, and in a serious case, the luminance difference between the high grays is eliminated so that the display image may appear to be distorted.

In order to enhance the lateral side visibility, it has been proposed that a pixel should be divided into two sub-pixels, which are capacitor-combined with each other. A voltage is directly applied to one of the sub-pixels, and a voltage drop is caused at the other sub-pixel due to the capacitor combination. In this way, the two sub-pixels are differentiated in voltage from each other and have different light transmittances.

However, with such a method, the transmittances of the two sub-pixels cannot be correctly controlled to the desired level, and in particular, the light transmittance is differentiated for the respective colors. Therefore, the voltages cannot be differently adjusted with respect to the respective colors. Furthermore, the aperture ratio is deteriorated due to the addition of a conductor for a capacitor combination, and the light transmittance is reduced due to the capacitor combination-induced voltage drop.

BRIEF SUMMARY OF THE INVENTION

The present invention provides a liquid crystal display ("LCD") improving lateral visibility without image deterioration or a decrease in aperture ratio, and a method of improving a display of the LCD.

Exemplary embodiments of the present invention provide a liquid crystal display including a first gate electrode formed on a substrate, a storage electrode formed on the substrate and separated from the first gate electrode, the storage electrode having a body and an extension, a gate insulating layer formed on the first gate electrode and the storage electrode, a first semiconductor formed on the gate insulating layer, a first source electrode formed on the first semiconductor, a first drain electrode formed on the first semiconductor, separated from the first source electrode, the first drain electrode having an end portion overlapping the first gate electrode, an expansion overlapping the body of the storage electrode and distanced from the end portion, and a connection connecting the end portion and the expansion, the connection overlapping the extension of the storage electrode, a passivation layer formed on the first source electrode and the first drain electrode and having a contact hole exposing the expansion of the first drain electrode, and a first field-generating electrode connected to the first drain electrode through the contact hole.

Other exemplary embodiments of the present invention provide a liquid crystal display including a plurality of pixels arranged in the form of a matrix, each pixel having first and second sub-pixels, a plurality of first signal lines connected to the first and second sub-pixels, a plurality of second signal lines intersecting the first signal lines and connected to the first sub-pixels, and a plurality of third signal lines intersecting the first signal lines and connected to the second sub-pixels. The first sub-pixels have first switching elements connected to the first and second signal lines, first liquid crystal capacitors connected to the first switching elements, and first storage capacitors connected to the first switching elements. The second sub-pixels have second switching elements connected to the first and third signal lines, second liquid crystal capacitors connected to the second switching elements, and second storage capacitors connected to the second switching elements. Voltages applied to the first and second liquid crystal capacitors are obtained from image information. The first sub-pixels are supplied with a voltage that is smaller than a voltage applied to the second sub-pixels with respect to a predetermined voltage. A storage capacitance of the first storage capacitors is larger than a first capacitance or a storage capacitance of the second storage capacitors is smaller than a second capacitance, where the first and second capacitances are capacitances of the first and second storage capacitors that cause kickback voltages of the first and second sub-pixels to be substantially equal to each other when the first and second sub-pixels are supplied with a same voltage.

Other exemplary embodiments of the present invention provide a liquid crystal display including a storage electrode formed on a substrate, the storage electrode having a body and an extension, and a first drain electrode having an end portion, an expansion overlapping the body of the storage electrode, and a connection connecting the end portion and the expansion, the connection overlapping the extension of the storage electrode.

Other exemplary embodiments of the present invention provide a method of improving a display of a liquid crystal display, the method including adjusting capacitance of at least one storage capacitor within each pixel based on a capacitance variation of liquid crystal capacitors supplied with different data voltages in the liquid crystal display, wherein aperture ratio is not decreased by adjusting capacitance of the at least one storage capacitor.

BRIEF DESCRIPTION OF THE DRAWINGS

The present invention will become more apparent by describing embodiments thereof in detail with reference to the accompanying drawings, in which:

FIGS. 7A and 7B are sectional views of the exemplary LCD shown in FIG. 6 taken along lines VIIA-VIIA, and VIIB-VIIB', VIIB'-VIIB", respectively;

DETAILED DESCRIPTION OF THE INVENTION

Figure 1A:
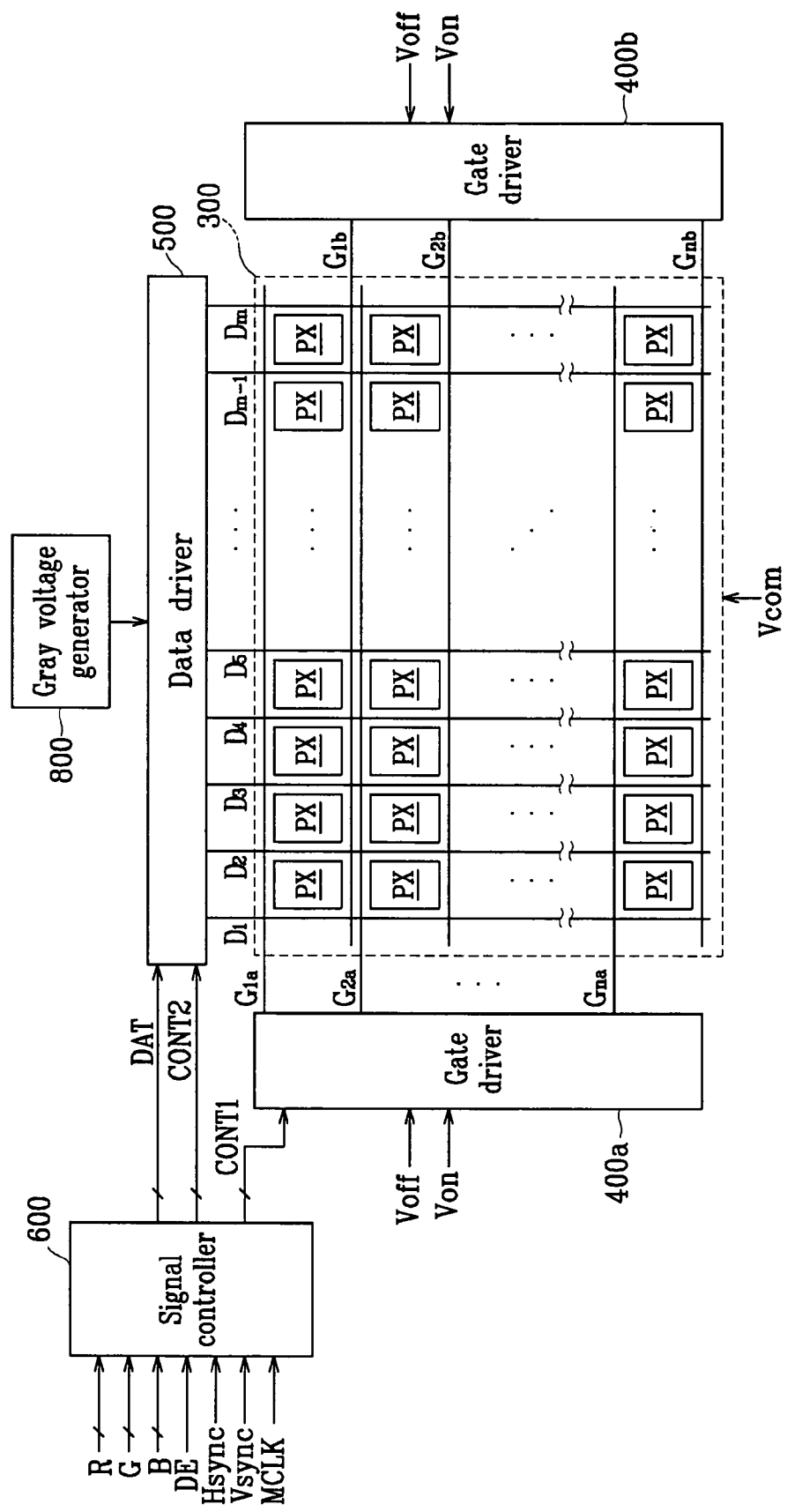
FIGS. 1A to 1C are block diagrams of an exemplary LCD according to an exemplary embodiment of the present invention.

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Now, LCDs according to exemplary embodiments of the present invention will be described with reference to FIGS. 1 to 3.

Figure 1B:
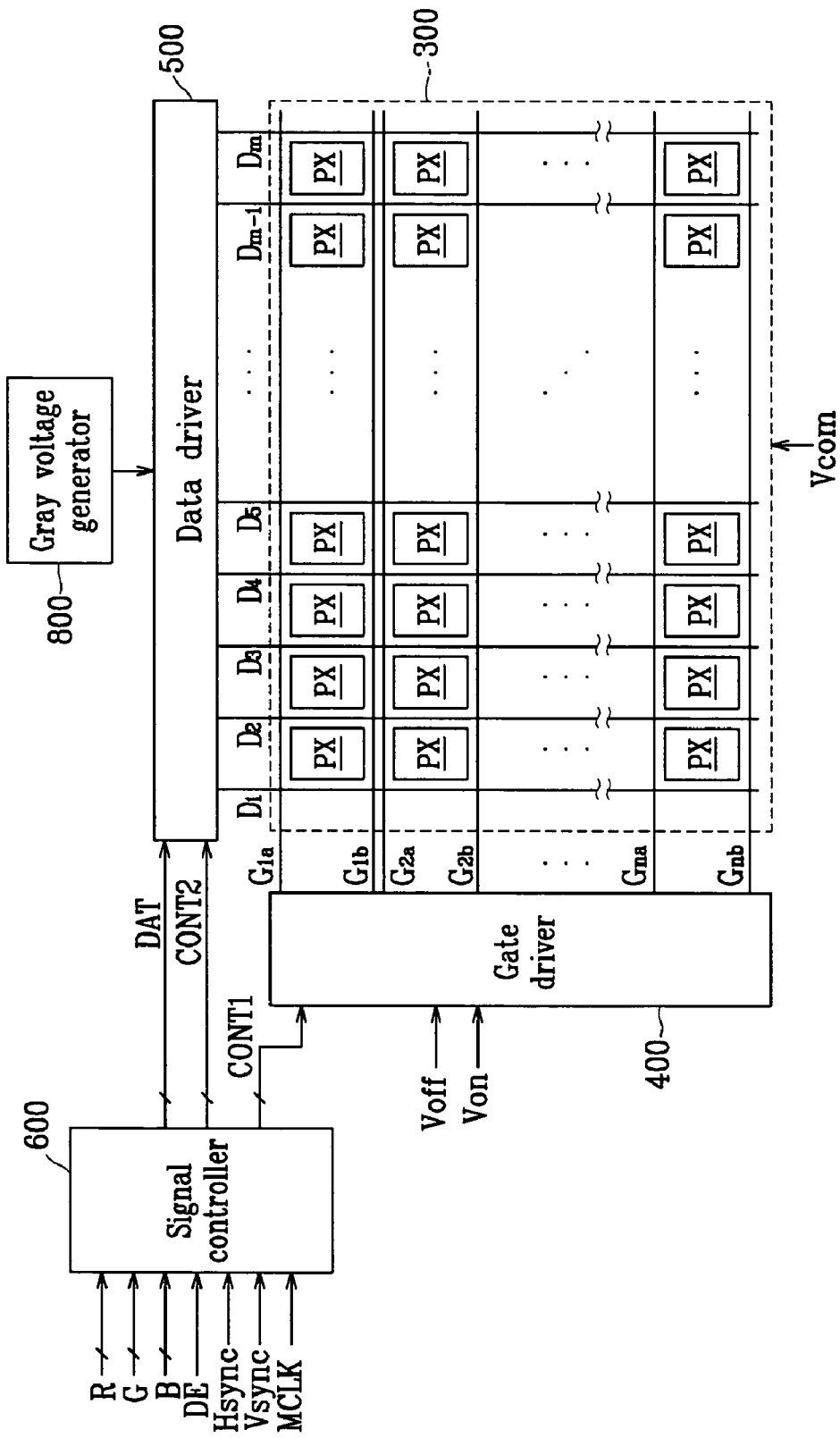
Figure 1C:
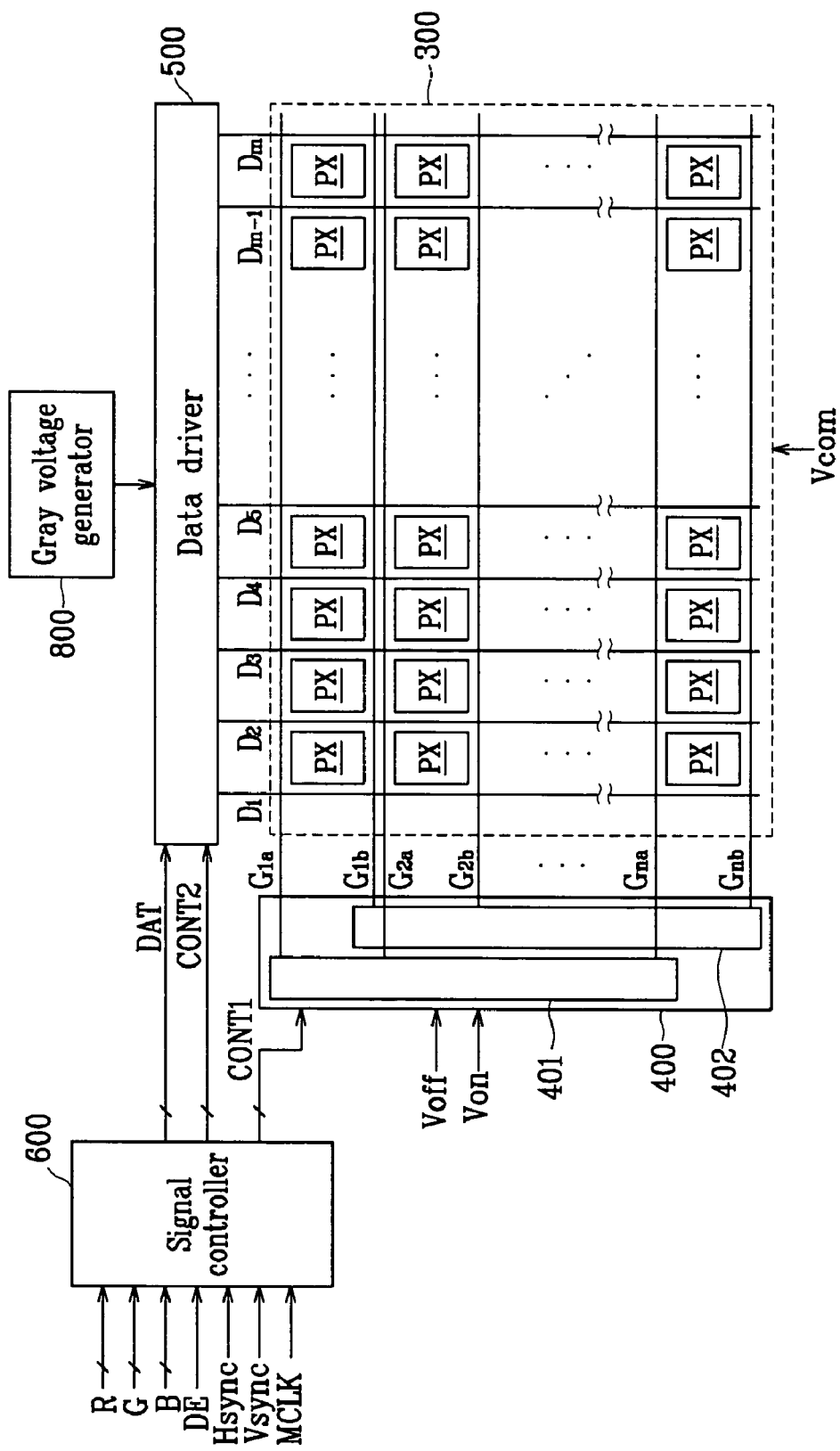
Figure 2:
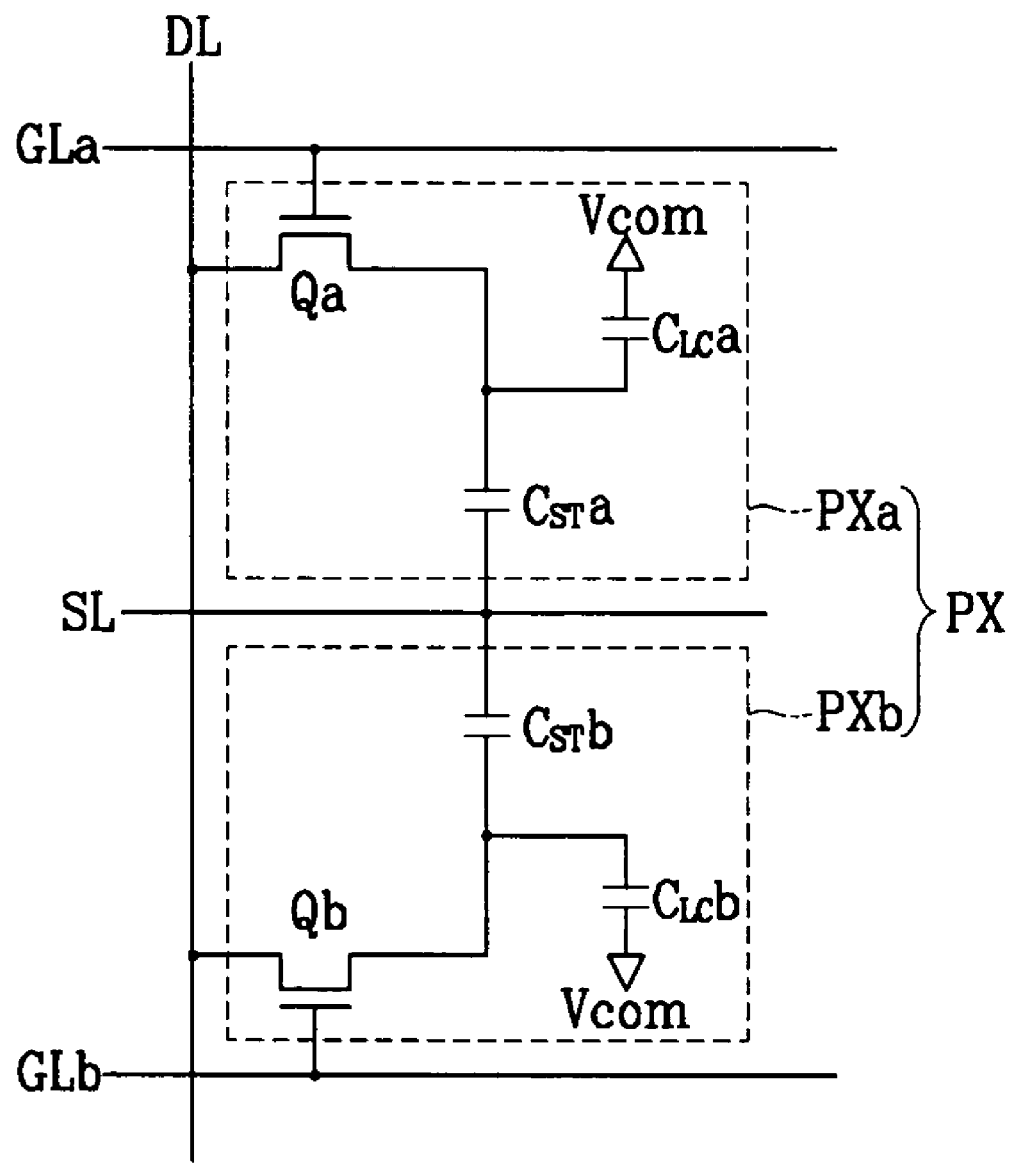
FIG. 2 is an equivalent circuit diagram of an exemplary pixel of the exemplary LCD shown in FIGS. 1A to 1C.

FIGS. 1A to 1C are block diagrams of an exemplary LCD according to an exemplary embodiment of the present invention, FIG. 2 is an equivalent circuit diagram of an exemplary pixel of the exemplary LCD shown in FIGS. 1A to 1C, and FIG. 3 is an equivalent circuit diagram of an exemplary sub-pixel of the exemplary LCD shown in FIGS. 1A to 1C.

As shown in FIGS. 1A to 1C, an LCD includes an LC panel assembly 300, a pair of gate drivers 400a and 400b, as shown in FIG. 1A, or a gate driver 400, as shown in FIGS. 1A and 1B, connected to the LC panel assembly 300, a data driver 500 connected to the LC panel assembly 300, a gray voltage generator 800 connected to the data driver 500, and a signal controller 600 for controlling the above-described elements.

Figure 3:
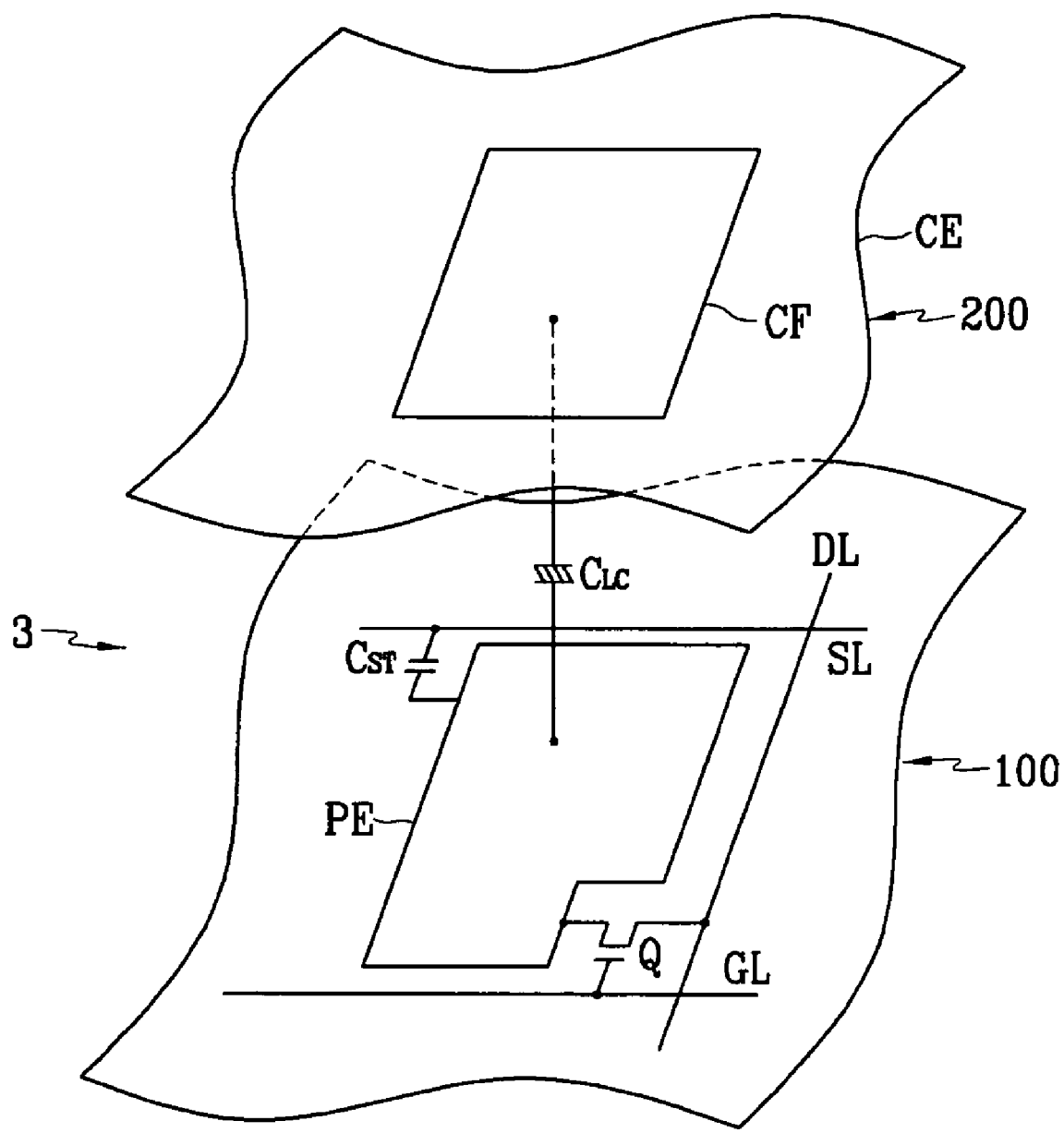
FIG. 3 is an equivalent circuit diagram of an exemplary sub-pixel of the exemplary LCD shown in FIGS. 1A to 1C.

The LC panel assembly 300, as further shown in FIGS. 2 and 3, includes a lower panel 100 also referred to as a TFT array panel, an upper panel 200 also referred to as a common electrode panel, and an LC layer 3 interposed there between, and it further includes a plurality of display signal lines $G_1$ to $G_n$ and $D_1$ to $D_m$ and a plurality of pixels PX connected thereto that are arranged substantially in a matrix format in a circuital view.

The display signal lines $G_{1a}$ to $G_{nb}$ and $D_1$ to $D_m$ are provided on the lower panel 100 and include a plurality of gate lines $G_{1a}$ to $G_{nb}$ for transmitting gate signals (also called scanning signals) and a plurality of data lines $D_1$ to $D_m$ for transmitting data signals. The gate lines $G_{1a}$ to $G_{nb}$ extend substantially in a row direction, a first direction, and are substantially parallel to each other, while the data lines $D_1$ to $D_m$ extend substantially in a column direction, a second direction, and are substantially parallel to each other. The first direction is substantially perpendicular to the second direction.

FIG. 2 illustrates the display signal lines and an equivalent circuit at one pixel PX. The display signal lines include a pair of gate lines indicated by GLa and GLb, data lines indicated by DL, and a storage electrode line SL. The storage electrode line SL extends substantially parallel to and between the gate lines GLa and GLb.

Each pixel PX includes a pair of sub-pixels PXa and PXb, and the sub-pixels PXa and PXb include switching elements Qa and Qb, LC capacitors $C_{LC}a$ and $C_{LC}b$ connected to the switching elements Qa and Qb, and storage capacitors $C_{ST}a$ and $C_{ST}b$, respectively. The storage capacitors $C_{ST}a$ and $C_{ST}b$ are connected to the switching elements Qa and Qb and the storage electrode line SL.

As shown in FIG. 3, the switching element Q of the respective sub-pixels PXa and PXb such as a thin film transistor ("TFT") is provided on the lower panel 100. The switching element Q has three terminals: a control terminal, such as a gate electrode, connected to the gate line GL; an input terminal, such as a source electrode, connected to the data line DL; and an output terminal, such as a drain electrode, connected to the LC capacitor $C_{LC}$ and the storage capacitor $C_{ST}$.

The LC capacitor $C_{LC}$ includes a sub-pixel electrode PE provided on the lower panel 100 and a common electrode CE provided on the upper panel 200, as two terminals. The LC layer 3 disposed between the two electrodes PE and CE functions as a dielectric of the LC capacitor $C_{LC}$. The sub-pixel electrode PE is connected to the switching element Q, and the common electrode CE is supplied with a common voltage Vcom and covers the entire surface of, or at least substantially the entire surface of, the upper panel 200. In an alternative embodiment, the common electrode CE may be provided on the lower panel 100, and both electrodes PE and CE may have shapes of bars or stripes.

The storage capacitor $C_{ST}$ is an auxiliary capacitor for the LC capacitor $C_{LC}$. The storage capacitor $C_{ST}$ includes the sub-pixel electrode PE and the storage electrode line SL, which is provided on the lower panel 100, overlaps the sub-pixel electrode PE via an insulator, and is supplied with a predetermined voltage such as the common voltage Vcom. Alternatively, the storage capacitor $C_{ST}$ includes the sub-pixel electrode PE and an adjacent gate line called a previous gate line, which overlaps the sub-pixel electrode PE via an insulator.

For color display, each pixel uniquely represents one color out of a set of main colors (i.e., spatial division) or each pixel PX sequentially represents the colors in turn (i.e., temporal division) such that a spatial or temporal sum of the colors is recognized as a desired color. An exemplary set of the main colors includes red, green, and blue colors, although other sets of colors would be within the scope of these embodiments. FIG. 3 shows an example of the spatial division in which each pixel PX includes a color filter CF representing one of the colors in an area of the upper panel 200. Alternatively, the color filter CF is provided on or under the sub-pixel electrode PE on the lower panel 100.

Referring to FIGS. 1A to 1C, the gate drivers 400a and 400b (or 400) are connected to the gate lines $G_{1a}$ to $G_{nb}$ of the LC panel assembly 300, and they synthesize the gate-on voltage Von and the gate-off voltage Voff to generate gate signals for application to the gate lines $G_{1a}$ to $G_{nb}$.

As shown in FIG. 1A, the pair of gate drivers 400a and 400b are respectively placed at left and right sides of the LC panel assembly 300, and they are connected to the odd_th and the even_th gate lines $G_{1a}$ to $G_{nb}$, respectively. Alternatively, as shown in FIGS. 1B and 1C, one gate driver 400 is placed at one side of the LC panel assembly 300, and is connected to all the gate lines $G_{1a}$ to $G_{nb}$. Although the gate driver 400 in FIGS. 1B and 1C is illustrated as disposed to the left of the LC panel assembly 300, the gate driver 400 may alternatively be positioned on the right side of the LC panel assembly 300. As shown in FIG. 1C, two driving circuits 401 and 402 are built into the gate driver 400, and are connected to the odd_th and the even_th gate lines $G_{1a}$ to $G_{nb}$, respectively.

The gray voltage generator 800 generates two sets of a plurality of gray voltages (or reference gray voltages) related to the transmittance of the pixels PX. The two gray voltage sets are independently given to the two sub-pixels PXa and PXb forming each pixel PX. The voltages of each gray voltage set have a positive polarity with respect to the common voltage Vcom or a negative polarity with respect to the common voltage Vcom. Alternatively, only one (reference) gray voltage set may be generated instead of the two (reference) gray voltage sets.

The data driver 500 is connected to the data lines $D_1$ to $D_m$ of the LC panel assembly 300 to select one of the two gray voltage sets from the gray voltage generator 800, and to apply one gray voltage of the selected gray voltage set to the pixel PX as a data voltage. However, in the case that the gray voltage generator 800 does not apply all the gray voltages but only applies the reference gray voltages, the data driver 500 divides the reference gray voltages and generates gray voltages with respect to all the grays while selecting the data voltages from the generated gray voltages.

The gate driver 400 of FIGS. 1B and 1C (or gate drivers 400a and 400b of FIG. 1A) or the data driver 500 is directly mounted on the LC panel assembly 300 in the form of one or more driving integrated circuit ("IC") chips, or is mounted on a flexible printed circuit ("FPC") film (not shown) and attached to the LC panel assembly 300 in the form of a tape carrier package ("TCP"). By contrast, the gate driver 400 (or 400a and 400b) or the data driver 500 may be integrated with the LC panel assembly 300.

The structure of an exemplary LCD according to an exemplary embodiment of the present invention will be described with reference to FIGS. 4 to 8.

Figure 4:
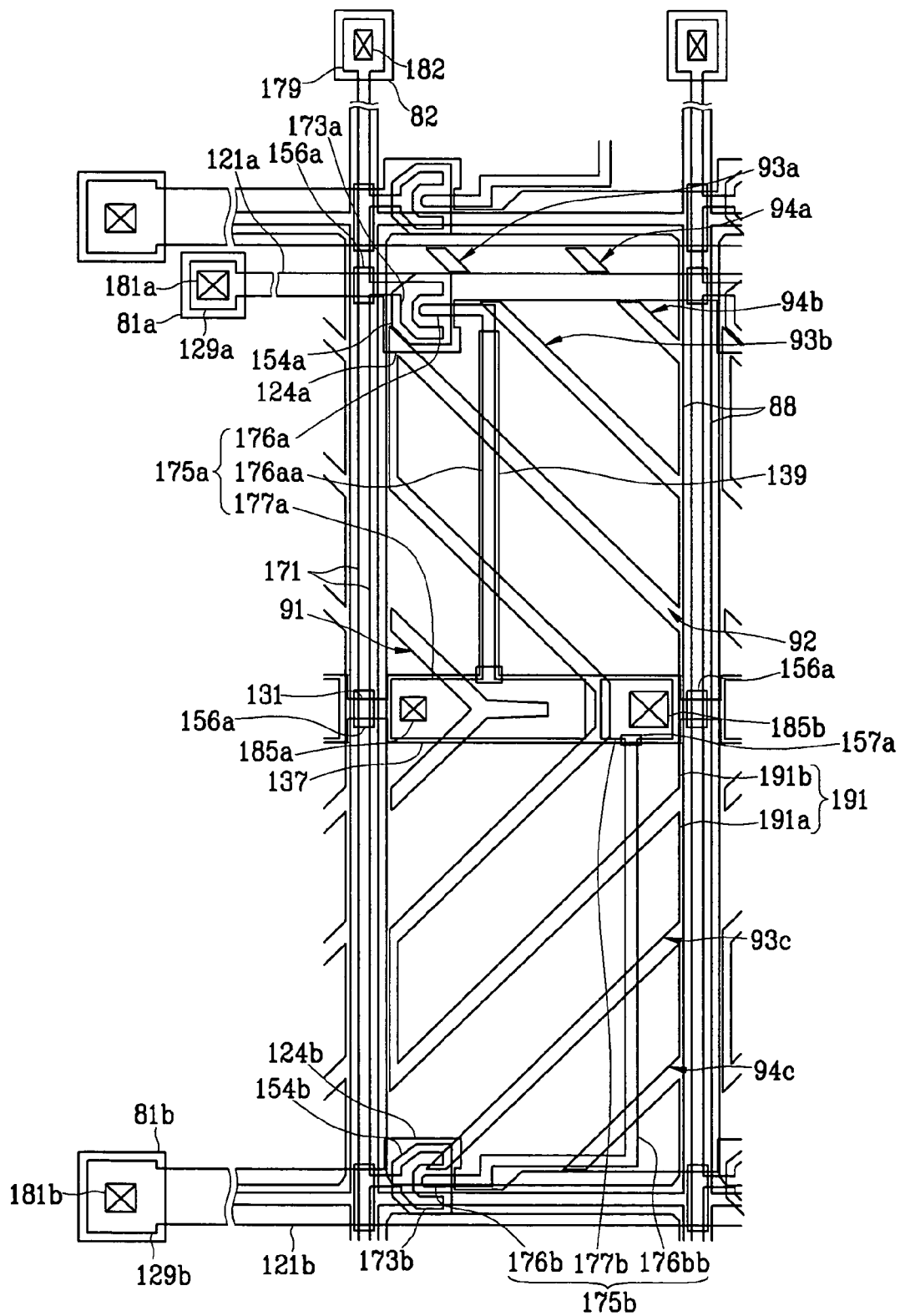
FIG. 4 is a layout view of an exemplary TFT array panel for an exemplary LCD according to an exemplary embodiment of the present invention.
Figure 5:
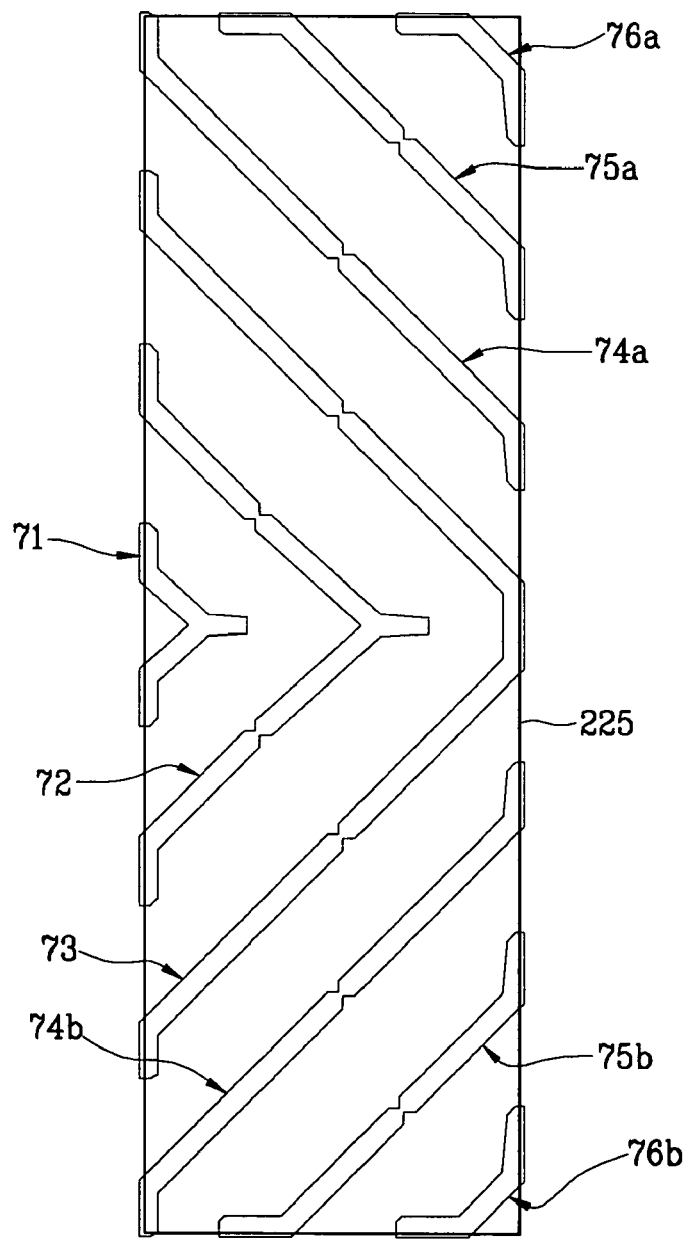
FIG. 5 is a layout view of an exemplary common electrode panel for an exemplary LCD according to an exemplary embodiment of the present invention.
Figure 6:
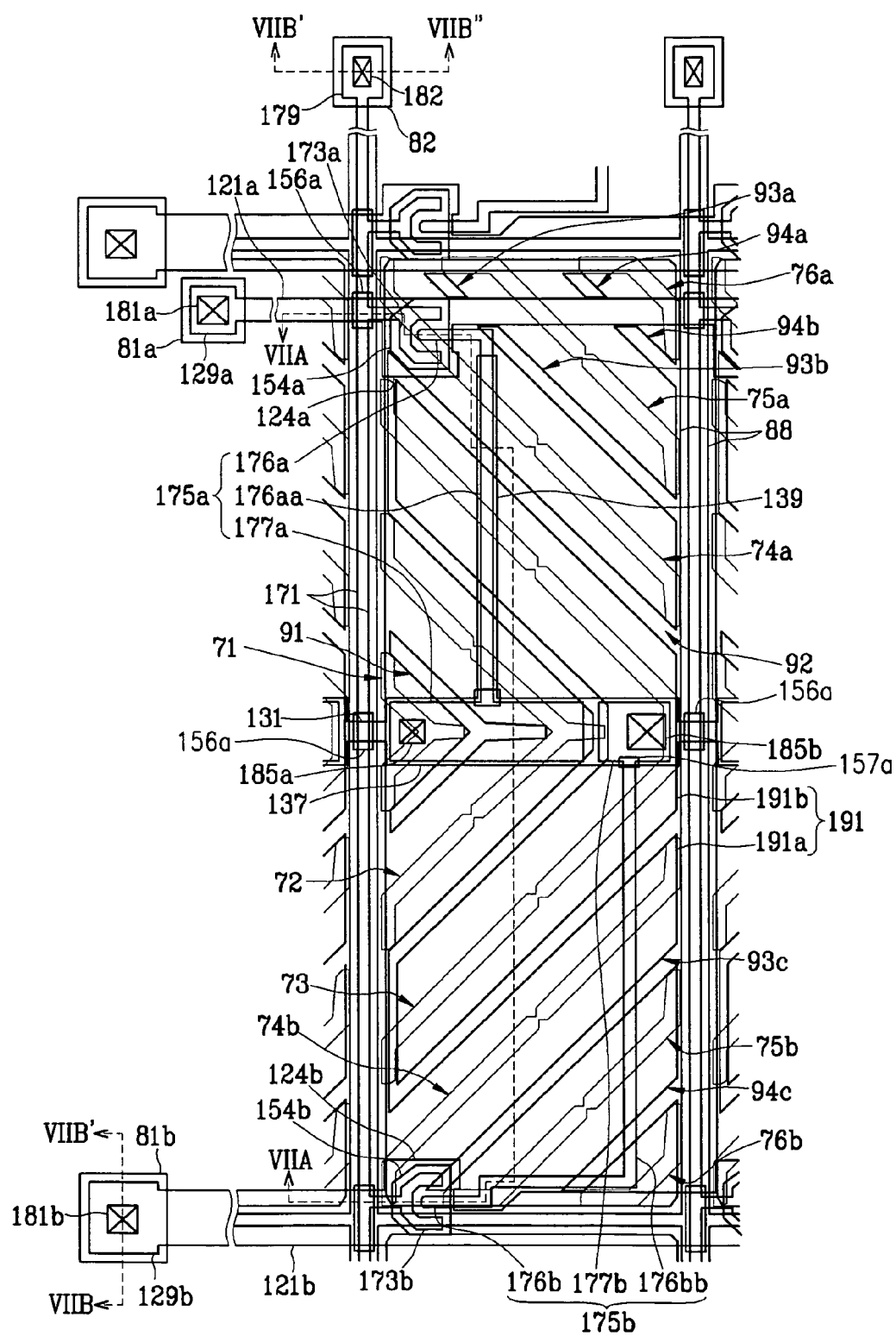
FIG. 6 is a layout view of an exemplary LCD including the exemplary TFT array panel shown in FIG. 4 and the exemplary common electrode panel shown in FIG. 5.
Figure 7B:
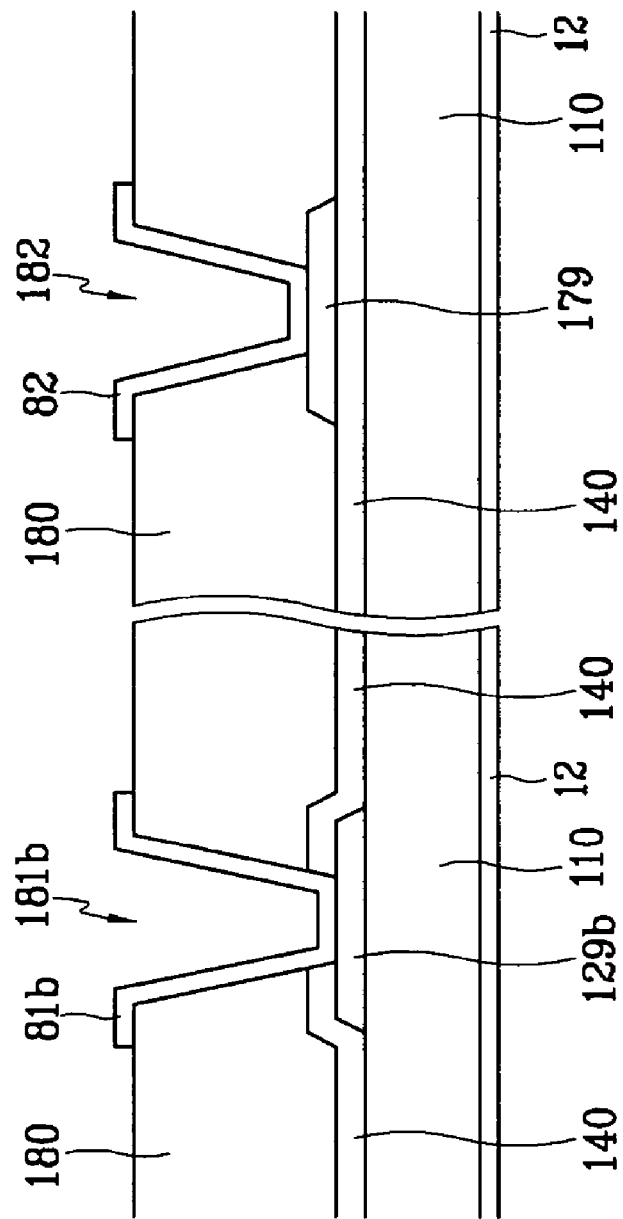
Figure 8:
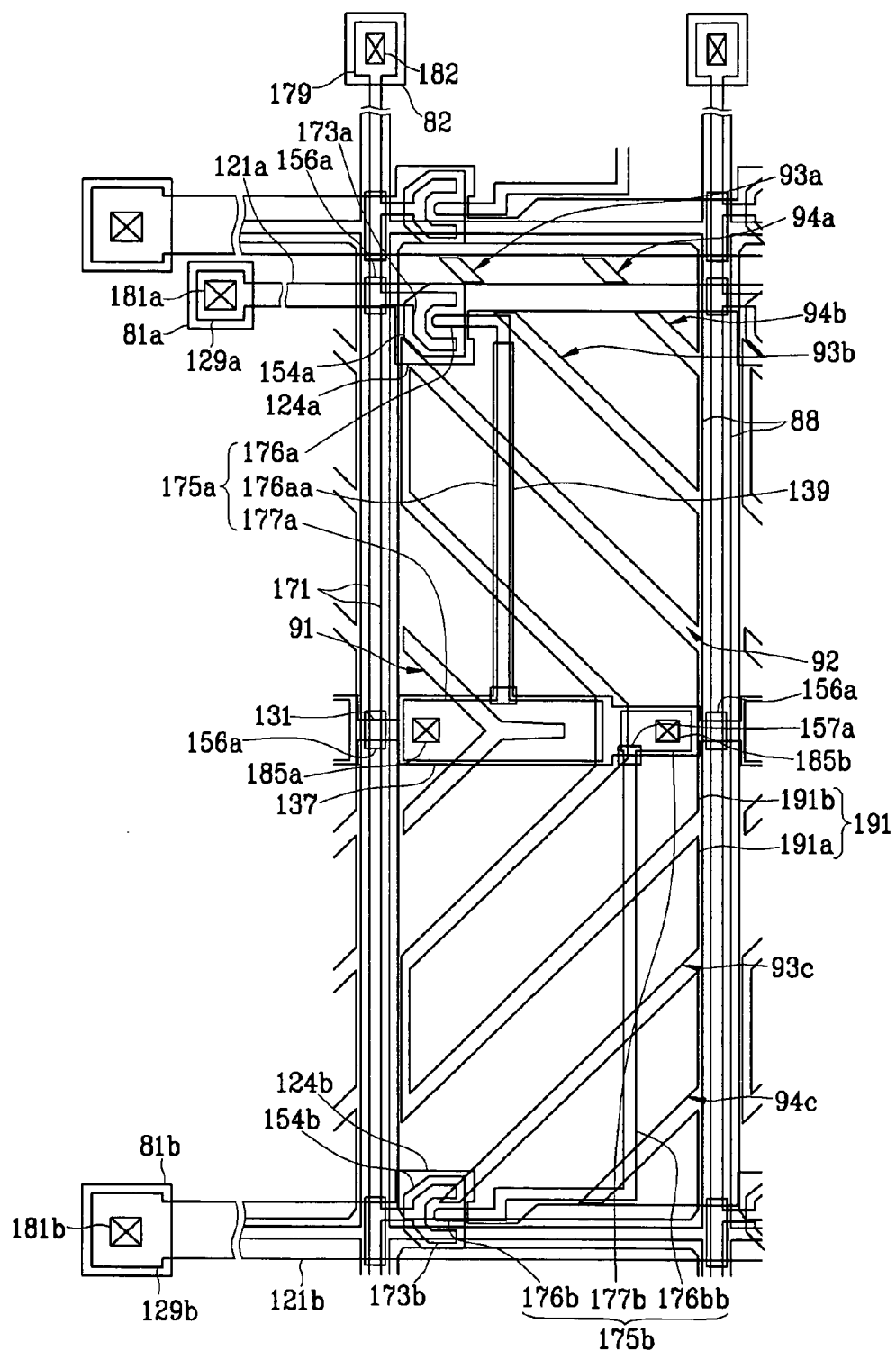
FIG. 8 is a layout view of an exemplary TFT array panel for another exemplary LCD according to an exemplary embodiment of the present invention.

FIG. 4 is a layout view of an exemplary TFT array panel for an exemplary LCD according to an exemplary embodiment of the present invention, and FIG. 5 is a layout view of an exemplary common electrode panel for an exemplary LCD according to an exemplary embodiment of the present invention. FIG. 6 is a layout view of an exemplary LCD including the exemplary TFT array panel shown in FIG. 4 and the exemplary common electrode panel shown in FIG. 5, FIGS. 7A and 7B are sectional views of the exemplary LCD shown in FIG. 6 taken along lines VIIA-VIIA, and VIIB-VIIB', VIIB'-VIIB", respectively, and FIG. 8 is a layout view of an exemplary TFT array panel for another exemplary LCD according to an exemplary embodiment of the present invention.

As shown in FIGS. 4 to 7B, the LCD includes a TFT array panel 100, a common electrode panel 200 facing the TFT array panel 100, and an LC layer 3 disposed between the panels 100 and 200.

First, the TFT array panel 100 will be described with reference to FIGS. 4 and 6 to 7B.

A plurality of pairs of first and second gate lines 121a and 121b and a plurality of storage electrode lines 131 are formed on an insulating substrate 110 made of a material such as, but not limited to, transparent glass or plastic.

The first and second gate lines 121a and 121b transmit gate signals and extend substantially in a transverse direction, a first direction. The first and second gate lines 121a and 121b are arranged on the upper and lower parts of a pixel PX, respectively. That is, the first and second gate lines 121a and 121b flank the pixel PX.

Each of the first gate lines 121a includes a plurality of gate electrodes 124a projecting downward, towards the pixel PX to which it is connected, and an end portion 129a having a large area for contact with another layer or an external driving circuit. The end portion 129a is illustrated as arranged at the left side thereof.

Each of the second gate lines 121b includes a plurality of gate electrodes 124b projecting upward, towards the pixel PX to which it is connected, and an end portion 129b having a large area for contact with another layer or an external driving circuit. The end portion 129b is illustrated as arranged at the left side thereof.

Alternatively, the end portions 129a and 129b may be arranged both at the right side of the first and second gate lines 121a and 121b or may be arranged at opposite sides from each other.

A gate driving circuit, such as that contained within gate driver 400, or gate drivers 400a and 400b, for generating the gate signals may be mounted on an FPC film (not shown), which may be attached to the substrate 110, directly mounted on the substrate 110, or integrated with the substrate 110. The gate lines 121a and 121b may extend to be connected to a driving circuit that may be integrated on the substrate 110.

The storage electrode lines 131 are supplied with a predetermined voltage and extend substantially in a transverse direction, the first direction, parallel to the gate lines 121a and 121b.

Each storage electrode line 131 is disposed between two adjacent gate lines 121a and 121b, and may be positioned closer to the first gate line 121a than the second gate line 121b, and nearly equidistant from two adjacent second gate lines 121b. Each storage electrode line 131 includes a plurality of storage electrodes 137 expanding upward and downward, that is, expanding towards the first gate line 121a and towards the second gate line 121b, and a plurality of bar-shaped extensions 139 longitudinally extending upward from the storage electrodes 137, that is, extending towards the first gate line 121a.

The storage electrodes 137 are substantially rectangular-shaped to be symmetrical to the storage electrode lines 131, and the extensions 139 extend to near the right portion of the first gate electrodes 124a.

While a particular configuration is illustrated, it should be understood that the storage electrode lines 131 as well as the storage electrodes 137 and extensions 139 may have various shapes and arrangements.

The first and second gate lines 121a and 121b and the storage electrode lines 131 are preferably made of an aluminum Al-containing metal such as Al and an Al alloy, a silver Ag-containing metal such as Ag and a Ag alloy, a copper Cu-containing metal such as Cu and a Cu alloy, a molybdenum Mo-containing metal such as Mo and a Mo alloy, chromium Cr, tantalum Ta, or titanium Ti. However, they may have a multi-layered structure including two conductive films (not shown) having different physical characteristics. In such a multi-layered structured, one of the films is preferably made of a low resistivity metal including an Al-containing metal, a Ag-containing metal, or a Cu-containing metal for reducing signal delay or voltage drop, while another of the films is preferably made of a material such as a Mo-containing metal, Cr, Ta, or Ti, which has good physical, chemical, and electrical contact characteristics with other materials such as indium tin oxide ("ITO") or indium zinc oxide ("IZO"). Examples of the combination of two films include a lower Cr film and an upper Al (alloy) film and a lower Al (alloy) film and an upper Mo (alloy) film. While particular examples are described, the gate lines 121 and the storage electrode lines 131 may be made of various metals or conductors.

The lateral sides of the first and second gate lines 121a and 121b and the storage electrode lines 131 are inclined relative to a surface of the substrate 110, and the inclination angle thereof ranges from about 30 to about 80 degrees.

A gate insulating layer 140 preferably made of, but not limited to, silicon nitride (SiNx) or silicon oxide (SiOx) is formed on the first and second gate lines 121a and 121b and the storage electrode lines 131, as well as on exposed surfaces of the insulating substrate 110.

A plurality of semiconductor islands 154a, 154b, 156a, and 157a, preferably made of hydrogenated amorphous silicon ("a-Si") or polysilicon, are formed on the gate insulating layer 140. The semiconductor islands 154a and 154b are disposed on the gate electrodes 124a and 124b, respectively. The semiconductor islands 156a and 157a cover edges of the first and second gate lines 121a and 121b, the storage electrode lines 131, and the storage electrodes 137 and extensions 139.

A plurality of pairs of ohmic contact islands 163a, 163b, 165a, 165b, and 166a are formed on the semiconductor islands 154a, 154b, and 156a, and a plurality of pairs of ohmic contact islands (not shown) may be formed on the semiconductor islands 157a.

The ohmic contacts 163a, 163b, 165a, 165b, and 166a are preferably made of n+ hydrogenated a-Si heavily doped with an n-type impurity such as phosphorous, or they may be made of silicide. A pair of the first ohmic contacts 163a and 163b and a pair of the second ohmic contact 165a and 165b are placed on the semiconductors 154a and 154b, respectively.

The lateral sides of the semiconductor islands 154a, 154b, 156a, and 157a and the ohmic contacts 163a, 163b, 165a, 165b, and 166a are inclined relative to the surface of the substrate 110, and the inclination angles thereof are preferably in a range of about 30 to about 80 degrees.

A plurality of data lines 171 and a plurality of pairs of first and second drain electrodes 175a and 175b are formed on the ohmic contacts 163a, 163b, 165a, 165b, and 166a, and on the gate insulating layer 140.

The data lines 171 transmit data signals and extend substantially in the longitudinal direction, the second direction substantially perpendicular to the first direction, to intersect the gate lines 121a and 121b and the storage electrode lines 131. Each data line 171 includes a plurality of source electrodes 173a and 173b projecting toward the gate electrodes 124a and 124b, respectively, and an end portion 179 having a large area for contact with another layer or an external driving circuit. A data driving circuit, such as within data driver 500, for generating the data signals may be mounted on an FPC film (not shown), which may be attached to the substrate 110, directly mounted on the substrate 110, or integrated with the substrate 110. The data lines 171 may extend to be connected to a driving circuit that may be integrated with the substrate 110.

The first and second drain electrodes 175a and 175b are separated from each other and from the data lines 171.

Each of the first drain electrodes 175a includes bar-shaped end portions 176a facing the first source electrodes 173a with respect to the first gate electrodes 124a, wide rectangular-shaped expansions 177a opposite to the end portions 176a, and bar-shaped connections 176aa connecting the expansions 177a to the end portions 176a. The bar-shaped end portions 176a may extend substantially parallel to the gate line 121a, and the bar-shaped connection 176aa may extend substantially parallel to the data line 171.

Each expansion 177a overlaps the storage electrode 137, and each end portion 176a overlaps a first gate electrode 124a and is partly enclosed by a first source electrode 173a curved like a character C. The connection 176aa of the first drain electrode 175a is mainly disposed on the extension 139 to extend parallel to the extension 139 and is disposed within a vertical boundary of the extension 139. That is, the extension 139 may have a greater width than the connection 176aa.

Similar to the first drain electrodes 175a, each second drain electrode 175b includes bar-shaped end portions 176b facing the second source electrodes 173b overlapping the second gate electrodes 124b, wide rectangular-shaped expansions 177b opposite to the end portions 176b, and bar-shaped connections 176bb connecting the expansions 177b to the end portions 176b. Each expansion 177b overlaps the storage electrode 137 and the end portion 176b overlaps the second gate electrode 124b and are partly enclosed by a second source electrode 173b curved like a character C. The area of the expansion 177b of the second drain electrode 175b is smaller than the area of the expansion 177a of the first drain electrode 175a.

As described above, since the extension 139 is disposed under the connection 176aa of the first drain electrode 175a, storage capacitance of the storage electrode 137 is increased. Therefore, the size of the storage electrode 137 is made smaller to increase the aperture ratio.

The first and second gate electrodes 124a and 124b, the first and second source electrodes 173a and 173b, and the first and second drain electrodes 175a and 175b along with the semiconductors 154a and 154b form first and second TFTs Qa and Qb having channels formed on the semiconductor islands 154a and 154b disposed between the source electrodes 173a and 173b and the drain electrodes 175a and 175b, respectively.

The data lines 171 and the drain electrodes 175a and 175b are preferably made of a refractory metal such as Cr, Mo, Ta, Ti, or alloys thereof. Alternatively, they may have a multilayered structure including a refractory metal film (not shown) and a low resistivity film (not shown). Examples of such a multi-layered structure include a double-layered structure including a lower Cr/Mo (alloy) film and an upper Al (alloy) film and a triple-layered structure of a lower Mo (alloy) film, an intermediate Al (alloy) film, and an upper Mo (alloy) film. While particular embodiments are described, the data lines 171 and the drain electrodes 175a and 175b may be made of various metals or conductors.

The data lines 171 and the drain electrodes 175a and 175b have inclined edge profiles, and the inclination angles thereof ranges from about 30 to about 80 degrees.

The ohmic contacts 163a, 163b, 165a, 165b, and 166a are interposed only between the underlying semiconductors 154a and 154b and the overlying data lines 171 and drain electrodes 175a and 175b thereon, and reduce the contact resistance there between. The semiconductors 156a and 157a disposed on the gate lines 121a and 121b and storage electrode lines 131 smooth the profile of the surface, thereby preventing the disconnection of the data lines 171 and the drain electrodes 175a and 175b. The semiconductor islands 154a and 154b include some exposed portions that are not covered with the data lines 171 and the drain electrodes 175a and 175b, such as portions located between the source electrodes 173a and 173b and the drain electrodes 175a and 175b, respectively, that form channels of the first and second TFTs Qa and Qb.

A passivation layer 180 is formed on the data lines 171 and the drain electrodes 175a and 175b and the exposed portions of the semiconductor islands 154a and 154b, as well as on any exposed portions of the gate insulating layer 140. The passivation layer 180 is preferably made of an inorganic or organic insulator and it may have a flat top surface. Examples of the inorganic insulator include, but are not limited to, silicon nitride and silicon oxide. The organic insulator may have photosensitivity and a dielectric constant of less than about 4.0. Although illustrated as a single layer, the passivation layer 180 may alternatively include a lower film of an inorganic insulator and an upper film of an organic insulator such that it takes the excellent insulating characteristics of the organic insulator while preventing the exposed portions of the semiconductor islands 154a and 154b from being damaged by the organic insulator.

The passivation layer 180 has a plurality of contact holes 182, 185a, and 185b exposing the end portions 179 of the data lines 171 and the expansions 177a and 177b of the first and second drain electrodes 175a and 175b, respectively. The passivation layer 180 and the gate insulating layer 140 have a plurality of contact holes 181a and 181b exposing the end portions 129a and 129b of the first and second gate lines 121a and 121b.

A plurality of pixel electrodes 191 each having first and second sub-pixel electrodes 191a and 191b, a plurality of shield electrodes 88, and a plurality of contact assistants 81a, 81b, and 82 are formed on the passivation layer 180, such as during a same manufacturing process. They are preferably made of a transparent conductor such as ITO and IZO, or a reflective conductor such as Ag, Al, Cr, and alloys thereof.

Each pixel electrode 191 approximates a rectangle that has four chamfered corners. The chamfered corners of the pixel electrode 191 make an angle of about 45 degrees with respect to the gate lines 121a and 121b.

A pair of sub-pixel electrodes 191a and 191b forming a pixel electrode 191 engage with each other with respect to a gap 92. The second sub-pixel electrode 191b is approximately a rotated equilateral trapezoid, the base thereof being dented, such as at a location of the storage electrode line 131, and is mainly surrounded by the first sub-pixel electrode 191a. The first sub-pixel electrode 191a has an upper trapezoid, a lower trapezoid, and a center trapezoid connected to each other at a left side of the pixel.

The first sub-pixel electrode 191a has cutouts 93a to 93c and 94a to 94c extending from the top side of the upper trapezoid and the bottom side of the lower trapezoid to each right side thereof, respectively. The first gate line 121a extends between the cutout 93a and the cutout 93b and between the cutout 94a and the cutout 94b. The center trapezoid of the first sub-pixel electrode 191a is fitted into the dented base of the second sub-pixel electrode 191b. The first sub-pixel electrode 191a includes a center cutout 91 that includes a transverse portion and a pair of oblique portions connected thereto. The transverse portion extends shortly along an imaginary center transverse line of the first sub-pixel electrode 191a, and the oblique portions extend from an end of the transverse portion to the left edge of the pixel electrode 191. The oblique portions make an angle of about 45 degrees with respect to the storage electrode line 131.

The gap 92 between the first sub-pixel electrode 191a and the second sub-pixel electrode 191b includes two pairs of upper and lower oblique portions and three longitudinal portions. The upper and lower oblique portions make an angle of about 45 degrees with respect to the gate lines 121a and 121b, respectively. For explanatory convenience, the gap 92 will also be referred to as a cutout. The cutouts 91 to 94c substantially have inversion symmetry with respect to the storage electrode line 131. The cutouts 91 to 94c make an angle of about 45 degrees with the gate lines 121a and 121b, and the cutouts between the first gate line 121a and the storage electrode line 131 extend substantially perpendicular to the cutouts between the storage electrode line 131 and the second gate line 121b. The pixel electrode 191 is partitioned into a plurality of partitions by the cutouts 92, 93a to 93c, and 94a to 94c. Accordingly, the pixel electrode 191 is horizontally bisected around the storage electrode line 131, and the upper half and the lower half of the pixel electrode 191 are partitioned into six partitions by the cutouts 91 to 94c, respectively.

While a particular embodiment of sub-pixel electrodes 191a and 191b and cutouts 91 to 94c is illustrated and described, the number of partitions or the number of the cutouts may alternatively be varied depending on design factors such as the size of pixels, the ratio of the transverse edges and the longitudinal edges of the pixel electrode 191, the type and characteristics of the liquid crystal layer 3, and so on.

The first and second sub-pixel electrodes 191a and 191b are physically and electrically connected to the first and second drain electrodes 175a and 175b through the contact holes 185a and 185b such that the first and second sub-pixel electrodes 191a and 191b receive data voltages from the first and second drain electrodes 175a and 175b via their expansions 177a and 177b, respectively. A pair of the sub-pixel electrodes 191a and 191b are supplied with different data voltages that are predetermined based on an input image signal, respectively, and the magnitudes of the data voltages may be determined depending upon the sizes and shape of the sub-pixel electrodes 191a and 191b. Furthermore, the areas of the sub-pixel electrodes 191a and 191b may differ from each other. For instance, the second sub-pixel electrode 191b receives a voltage that is higher than that of the first sub-pixel electrode 191a, and the second sub-pixel electrode 191b is smaller in area than the first sub-pixel electrode 191a.

The sub-pixel electrodes 191a and 191b that are supplied with the data voltages and the common electrode 270 of the common electrode panel 200 that is supplied with a common voltage form capacitors $C_{LC}a$ and $C_{LC}b$ that are referred to as "liquid crystal capacitors," ("LC capacitors") which store applied voltages after the TFT turns off. Each of the LC capacitors $C_{LC}a$ and $C_{LC}b$ includes the LC layer 3 as a dielectric.

The first and second sub-pixel electrodes 191a and 191b and the expansions 177a and 177b connected thereto overlap a storage electrode line 131 including a storage electrode 137 and an extension 139. The first and second sub-pixel electrodes 191a and 191b and the expansions 177a and 177b connected thereto and the storage electrode line 131 form additional capacitors $C_{ST}a$ and $C_{ST}b$ referred to as "storage capacitors," which enhance the voltage storing capacity of the LC capacitors $C_{LC}a$ and $C_{LC}b$, respectively.

The shielding electrode 88 of each pixel is supplied with the common voltage, and it includes longitudinal portions extending along the data lines 171 and transverse portions extending along the second gate lines 121b. The longitudinal portions fully cover the data lines 171, and the transverse portions lie within the boundary of the second gate lines 121b. The shielding electrodes 88 block electric fields that are generated between the data lines 171 and the pixel electrodes 191 and between the data lines 171 and the common electrode 270 to reduce the distortion of the voltage of the pixel electrode 191 and the signal delay of the data voltages transmitted by the data lines 171. If necessary, the shielding electrode 88 may be omitted.

The contact assistants 81a, 81b, and 82 are connected to the end portions 129a and 129b of the gate lines 121a and 121b and the end portions 179 of the data lines 171 through the contact holes 181a, 181b, and 182, respectively. The contact assistants 81a, 81b, and 82 protect the end portions 129a, 129b, and 179 and enhance the adhesion between the end portions 129a, 129b, and 179, and external devices.

A description of the common electrode panel 200 follows with reference to FIGS. 5 to 7B.

A light blocking member 220, referred to as a black matrix, for preventing light leakage is formed on an insulating substrate 210 made of a material such as, but not limited to, transparent glass or plastic.

The light blocking member 220 has a plurality of openings 225 that face the pixel electrodes 191, and it may have substantially the same planar shape as the pixel electrodes 191. Otherwise, the light blocking member 220 may include a plurality of rectilinear portions facing the data lines 171 on the TFT array panel 100 and a plurality of widened portions facing the TFTs Qa and Qb on the TFT array panel 100. However, the light blocking member 220 may be formed with various shapes for preventing light leakage near the pixel electrodes 191 and the TFTs Qa and Qb.

A plurality of color filters 230 are also formed on the substrate 210, and they are disposed substantially within the areas enclosed by the light blocking member 220. The color filters 230 may extend substantially in the longitudinal direction along the pixel electrodes 191. The color filters 230 may represent one of three colors such as, but not limited to, red, green, and blue colors.

An overcoat 250 is formed on the color filters 230 and the light blocking member 220. The overcoat 250 is preferably made of an (organic) insulator, and it prevents the color filters 230 from being exposed and provides a flat surface. In an alternative embodiment, the overcoat 250 may be omitted.

A common electrode 270 is formed on the overcoat 250. The common electrode 270 is preferably made of a transparent conductive material such as, but not limited to, ITO and IZO, and has a plurality of sets of cutouts, such as cutouts 71, 72, 73, 74a, 74b, 75a, 75b, 76a, and 76b.

A set of cutouts 71 to 76b face a pixel electrode 191 and include center cutouts 71 to 73, upper cutouts 74a, 75a, and 76a, and lower cutouts 74b, 75b, and 76b. Each of the cutouts 71 to 76b within one set of cutouts 71 to 76b is disposed on the common electrode 270 at a location corresponding to locations between adjacent cutouts 91 to 94c of the pixel electrode 191, between a cutout 91, 94a, 94b, or 94c and a chamfered edge of the pixel electrode 191, or between left edges of the pixel electrodes 191. In addition, each of the cutouts 71 to 76b has at least an oblique portion extending parallel to the cutout 91 to 94c of the pixel electrode 191.

Each of the lower and the upper cutouts 74a to 76b includes an oblique portion, and a pair of transverse and longitudinal portions or a pair of longitudinal portions. The oblique portion extends approximately from a right edge to an upper edge or lower edge of the pixel electrodes and parallel to the upper and lower cutouts 93a to 94c of the pixel electrodes 191. The transverse and longitudinal portions extend from respective ends of the oblique portions corresponding to locations along edges of the pixel electrodes 191, overlapping the edges thereof, and making obtuse angles with the oblique portion.

Each of the center cutouts 71 and 72 includes a central transverse portion, a pair of oblique portions, and a pair of terminal longitudinal portions. The central transverse portion extends on the common electrode 270 at a location approximately corresponding from a center or the right edge of the pixel electrode 191 along the storage electrode line 131. The oblique portions extend from an end of the central transverse portion approximately to locations corresponding to the left edge of the pixel electrode 191 and approximately parallel to the respective lower and upper cutouts 74a to 76a. The terminal longitudinal portions extend from the ends of the respective oblique portions corresponding to locations along the left edge of the pixel electrode 191, overlapping the left edge of the pixel electrode 191, and making obtuse angles with the respective oblique portions.

As illustrated, the oblique portions of the cutouts 73 to 76b include triangular-shaped notches.

The notches may be formed in the shape of a rectangle, a trapezoid, or a semi-circle, or they may be concave or convex. The notches determine the tilt directions of LC molecules of the LC layer 3 located at the regional boundary corresponding to the cutouts 71 to 76b.

The set of cutouts 71 to 76b may be repeated across the common electrode 270 at locations corresponding to locations of pixel electrodes 191.

While a particular arrangement of one set of cutouts 71 to 76b has been illustrated and described, the number and the arrangements of the cutouts 71 to 76b may alternatively be varied depending on design factors, and the light blocking member 220 may overlap the cutouts 71 to 76b to block the light leakage through the cutouts 71 to 76b.

Alignment layers 11 and 21 that may be homeotropic are coated on inner surfaces of the panels 100 and 200, and polarizers 12 and 22 are provided on outer surfaces of the panels 100 and 200 so that their polarization axes may be crossed and one of the polarization axes may be parallel to the gate lines 121a and 121b. One of the polarizers 12 and 22 may be omitted when the LCD is a reflective LCD.

The LCD may further include at least one retardation film (not shown) for compensating the retardation of the LC layer 3. The retardation film has birefringence and retards opposite to the LC layer 3.

It is preferable that the LC layer 3 has negative dielectric anisotropy and that it is subjected to a vertical alignment such that the LC molecules in the LC layer 3 are aligned with their long axes substantially vertical to the surfaces of the panels 100 and 200 in the absence of an electric field. Accordingly, incident light cannot pass through the crossed polarization system 12 and 22.

Upon application of the common voltage to the common electrode 270 and a data voltage to a pixel electrode 191, voltage differences across the LC capacitors $C_{LC}a$ and $C_{LC}b$ are generated and thereby an electric field that is substantially perpendicular to the surfaces of the panels 100 and 200 is generated. Both the pixel electrode 191 and the common electrode 270 are commonly referred to as "field-generating electrodes" hereinafter. The LC molecules tend to vary their tilt directions and change their orientations in response to the electric field such that their long axes are perpendicular to the field direction and a variation amount of polarization of incident light is varied depending upon the orientations of the LC molecules in the LC layer 3. The polarization variation causes a transmittance variation by the polarizers 12 and 22 and thereby an image is represented on the LCD.

Tilt angles of the LC molecules are varied based on the strength of the electric field. When the voltage applied to the first sub-pixel electrode 191a is smaller than that applied to the second sub-pixel electrode 191b, a voltage Va across the first LC capacitor $C_{LC}a$ is larger than a voltage Vb across the second LC capacitor $C_{LC}b$ so that the tilt angles of LC molecules in a first sub-pixel PXa and a second sub-pixel PXb are different from each other, and thereby luminance of the sub-pixels PXa and PXb differ from each other. Accordingly, when the voltages Va and Vb for the LC capacitor $C_{LC}a$ and $C_{LC}b$ are suitably adjusted, an image viewed at a lateral side becomes close to that viewed at a front side, thereby enhancing lateral visibility of the LCD.

The tilt directions of the LC molecules are determined by horizontal components caused by distortion of the electric field generated by the oblique edges of the cutouts 71 to 76b and 91 to 94c and the pixel electrodes 191, and the horizontal components are perpendicular to edges of the cutouts 71 to 76b and 91 to 94 and edges of the pixel electrodes 191.

Referring to FIG. 6, a set of the cutouts 71 to 76b or 91 to 94c divides a pixel electrode 171 into a plurality of sub-areas, and each sub-area has two major edges making oblique angles with the major edges of the pixel electrode 191. Tilt directions of the LC molecules of the respective sub-areas are determined based on the directions defined by horizontal components of the electric field, and the tilt directions generally have four directions, thereby increasing the reference viewing angle of the LCD.

While exemplary embodiments of the cutouts 71 to 76b and 91 to 94c are illustrated and described, the shapes and the arrangements of the cutouts 71 to 76b and 91 to 94c may be modified in alternative embodiments.

In an alternative embodiment, at least one of the cutouts 71 to 76b and 91 to 94c can be substituted with protrusions (not shown) or depressions (not shown). The protrusions are preferably made of an organic or inorganic material and disposed on or under the field-generating electrodes 191 or 270.

Next, the operation of the above-described LCD will be described with reference to FIGS. 1A and 2.

The signal controller 600 is supplied with input image signals R, G, and B and input control signals for controlling the display thereof from an external graphics controller (not shown). The input image signals R, G, and B contain luminance information of each pixel PX, and the luminance has a predetermined number of grays, for example $1024(=2^{10})$, $256(=2^8)$, or $64(=2^6)$ grays. The input control signals include a vertical synchronization signal Vsync, a horizontal synchronization signal Hsync, a main clock signal MCLK, a data enable signal DE, etc.

After generating gate control signals CONT1 and data control signals CONT2 and processing the image signals R, G, and B to be suitable for the operation of the LC panel assembly 300 on the basis of the input control signals and the input image signals R, G, and B, the signal controller 600 transmits the gate control signals CONT1 to the gate drivers 400a and 400b, and the processed image signals DAT and the data control signals CONT2 to the data driver 500.

The gate control signals CONT1 include a scanning start signal STV for instructing to start scanning and at least a clock signal for controlling the output time of the gate-on voltage Von.

The data control signals CONT2 include a horizontal synchronization start signal STH for informing of start of data transmission for a group of sub-pixels PXa and PXb in each pixel PX, a load signal LOAD for instructing to apply the data voltages to the data lines $D_1$ to $D_m$, and a data clock signal HCLK. The data control signals CONT2 may further include an inversion signal RVS for reversing the polarity of the data voltages (with respect to the common voltage Vcom).

In response to the data control signals CONT2 from the signal controller 600, the data driver 500 receives a packet of the image data DAT for the group of sub-pixels PXa and PXb from the signal controller 600 and receives one of the two sets of gray voltages supplied from the gray voltage generator 800. The data driver 500 converts the image data DAT into analog data voltages selected from the gray voltages supplied from the gray voltage generator 800, and applies the data voltages to the data lines $D_1$ to $D_m$.

Alternatively, a separately provided external selection circuit (not shown) rather than the data driver 500 may select and transmit one of the two groups of gray voltages to the data driver 500, or the gray voltage generator 800 may supply reference voltages having varying magnitudes and that are divided by the data driver 500 to form gray voltages.

The gate drivers 400a and 400b apply the gate-on voltage Von to the gate lines $G_{1a}$ to $G_{nb}$ in response to the gate control signals CONT1 from the signal controller 600, thereby turning on the switching elements Qa and Qb connected thereto. The data voltages from the data driver 500 applied to the data lines $D_1$ to $D_m$ are supplied to the sub-pixels PXa and PXb through the activated switching elements Qa and Qb.

The difference between the data voltage applied to the sub-pixels PXa and PXb and the common voltage Vcom is represented as a voltage across the LC capacitor $C_{LC}$a and $C_{LC}$b, which is referred to as a pixel voltage. The LC molecules in the LC capacitor $C_{LC}$a and $C_{LC}$b have orientations depending on the magnitude of the pixel voltage, and the molecular orientations determine the polarization of light passing through the LC layer 3. The polarizers 12 and/or 22 convert the light polarization into the light transmittance such that the pixels PX display the luminance represented by the image data DAT.

The above-described two groups of gray voltages show two different gamma curves. Since the two groups are supplied with the two sub-pixels PXa and PXb of a pixel PX, the synthesis of the two gamma curves forms a gamma curve for a pixel PX. The two groups of the gray voltages are preferably determined such that the synthesized gamma curve approaches a reference gamma curve at a front view. For example, the synthesized gamma curve at a front view coincides with the most suitable reference gamma curve at a front view, and the synthesized gamma curve at a lateral view is the most similar to the reference gamma curve at a front view. Therefore, the lateral visibility may be improved.

As described above, since the area of the second sub-pixel electrode 191b which is supplied with a larger voltage than the first sub-pixel electrode 191a is smaller than the area of the first sub-pixel electrode 191a, the distortion of the lateral visibility is decreased. In particular, when the area ratio of the first sub-pixel electrode 191a and the second sub-pixel electrode 191b is about 2:1, the latter gamma curve closely approaches the front gamma curve, thereby much improving the lateral visibility.

By repeating this procedure by a unit of half of a horizontal period (which is denoted by "½H" and is equal to half a period of the horizontal synchronization signal Hsync or the data enable signal DE), all gate lines $G_{1a}$ to $G_{nb}$ are sequentially supplied with the gate-on voltage Von during a frame, thereby applying the data voltages to all pixels.

When the next frame starts after one frame finishes, the inversion control signal RVS applied to the data driver 500 is controlled such that the polarity of the data voltages is reversed (which is referred to as "frame inversion"). The inversion control signal RVS may also be controlled such that the polarity of the image data signals flowing in a data line are periodically reversed during one frame (for example, row inversion and dot inversion), or the polarity of the image data signals in one packet are reversed (for example, column inversion and dot inversion).

Meanwhile, with reference to FIG. 3, a kickback voltage Vk defined below is generated by parasitic capacitance Cgd between the control terminal (gate electrode) and output terminal (drain electrode) of the switching element Q when a state of the gate signal is changed from the gate-on voltage Von into the gate-off voltage Voff and causes a decrease of a voltage applied to the pixel electrode PE.

$$Vk=[Cgd/(C_{LC}+C_{ST}+Cgd)]\times \Delta Vg$$

Here, $\Delta Vg$ is a difference voltage between the gate-on voltage Von and the gate-off voltage Voff.

As will be further described below, the magnitudes of the kickback voltages Vka and Vkb of the first and second sub-pixels PXa and PXb of the LCD according to the exemplary embodiments of the present invention are substantially equal to each other.

The capacitance of the LC capacitors $C_{LC}$a and $C_{LC}$b of the first and second sub-pixels PXa and PXb is defined by the areas of the first and second sub-pixel electrodes 191a and 191b. For example, the first sub-pixel electrode 191a may have a larger area than the second sub-pixel electrode 191b. Therefore, when the magnitudes of the voltages applied to the first and second sub-pixel electrodes 191a and 191b are substantially equal to each other, the capacitance of the first LC capacitor $C_{LC}$a is larger than that of the second LC capacitor $C_{LC}$b. In addition, the area of the expansion 177a of the first drain electrode 175a overlapping the storage electrode 137 is larger than the area of the expansion 177b of the second drain electrode 175b. However, the first LC capacitor $C_{LC}$a of the first sub-pixel electrode 191a mostly operating at low grays has a lower dielectric constant that is defined by the orientation of the LC molecules than that of the second LC capacitor $C_{LC}$b of the second sub-pixel electrode 191b mostly operating at upper grays, so that the capacitance of the first LC capacitor $C_{LC}$a is decreased and the capacitance of the second LC capacitor $C_{LC}$b is increased.

Accordingly, when the capacitance of the LC capacitors $C_{LC}$a and $C_{LC}$b of the first and second sub-pixel electrodes 191a and 191b is fixed, the magnitude of the kickback voltage Vka of the first sub-pixel electrode 191a is larger than the magnitude of the kickback voltage Vkb of the second sub-pixel electrode 191b. As a result, for equilibrating the kickback voltages Vka and Vkb, the capacitance of the first and second storage capacitors $C_{ST}$a and $C_{ST}$b should be adjusted.

To increase the capacitance of the storage capacitor $C_{ST}$a for preventing increments of the kickback voltage Vka, the extension 139 of the storage electrode 137 that is overlapped by the connection 176aa of the first drain electrode 175a should be further formed or the vertical width of the expansion 177a of the first drain electrode 175 and the storage electrode 137 overlapped by the expansion 177a should be enlarged. Since the magnitudes of the kickback voltages Vka and Vkb of the first and second sub-pixels PXa and PXb are substantially equal to each other, the optimal magnitude of the common voltage Vcom is defined and the kickback voltages Vka and Vkb also equilibrate, and thereby a flicker phenomenon is prevented.

As shown in FIGS. 4 to 7, the storage capacitor $C_{ST}$a is further formed by the extension 139 of the storage electrode 137 overlapped by the connection 176aa of the first drain electrode 175a, so that sufficient storage capacitance of the storage capacitor $C_{ST}$a is ensured even though the area of the storage electrode 137 is decreased, and the aperture ratio also increases since the area of the storage electrode 137 overlapped by the expansion 177a need not be enlarged.

In addition, by adjusting the areas of the first and second drain electrodes 175a and 175b overlapping the storage electrode 137 and its extension 139, the capacitance of the first and second storage capacitors $C_{ST}a$ and $C_{ST}b$ may be defined so that the kickback voltages Vka and Vkb thereof are equal to each other. Furthermore, the gate signals applied to the first and second sub-pixels PXa and PXb via the first and second gate lines 121a and 121b may be different. For an example, the ΔVg may be adjusted by changing the magnitude of the gate-on voltage Von, thereby making the magnitudes of the kickback voltages Vka and Vkb equal.

Since the common electrode 270 and the shielding electrodes 88 are supplied with the same common voltage Vcom, almost no electric field is generated there between. Therefore, the LC molecules disposed between the common electrode 270 and the shielding electrodes 88 have a maintained initial vertical alignment state, thereby blocking incident light.

Next, another exemplary LCD according to the exemplary embodiments of the present invention will be described with reference to FIG. 8.

FIG. 8 is a layout view of an exemplary TFT array panel for another exemplary LCD according to an exemplary embodiment of the present invention.

Referring to FIG. 8, layered structures of the TFT array panel of the LCD shown in FIG. 8 are substantially the same as those shown in FIG. 4, and therefore further reference may be made to the description of FIG. 4 for like elements.

A plurality of first and second gate lines 121a and 121b including first and second gate electrodes 124a and 124 and end portions 129a and 129b and a plurality of storage electrode lines 131 including storage electrodes 137 and extensions 139 are formed on an insulating substrate 110. A gate insulating layer 140, a plurality of semiconductor islands 154a, 154b, 157a, and a plurality of ohmic contact islands (not shown) are sequentially formed on the gate lines 121a and 121b and the storage electrode lines 131. A plurality of data lines 171, each including source electrodes 173a and 173b and end portions 179, and a plurality of drain electrodes 175a and 175b including expansions 177a and 177b, end portions 176a and 176b, and connections 176aa and 176bb are formed on the ohmic contacts and the gate insulating layer 140. A passivation layer 180 is formed on the data lines 171, the drain electrodes 175a and 175b, and the exposed portions of the semiconductors 154a and 154b. A plurality of contact holes 181a, 181b, 182, 185a, and 185b are provided at the passivation layer 180 and the gate insulating layer 140. A plurality of pixel electrodes 191, a plurality of shielding electrodes 88, and a plurality of contact assistants 81a, 81b, and 82 are formed on the passivation layer 180.

Differing from the TFT array panel shown in FIG. 4, the widths of the expansion 177b of the second drain electrode 175b and the portion of the storage electrode 137 overlapped by the expansion 177b, located on a right side of each pixel PX, are narrower than those shown in FIG. 4. Therefore, when the first sub-pixel electrode 191a is supplied with a lower voltage than the second sub-pixel electrode 191b, the capacitance of the second LC capacitor $C_{LC}b$ increases to prevent the kickback voltage Vkb from becoming smaller than the kickback voltage Vka. Accordingly, the magnitudes of the kickback voltages Vka and Vkb substantially become equal to each other, and thereby the optimal common voltage Vcom may be defined and the magnitudes of the kickback voltages Vka and Vkb may be equilibrated, thus preventing the flicker phenomenon and the decrease of the aperture ratio.

Various characteristics based on the TFT array panel shown in FIG. 4 may be applied to the TFT array panel shown in FIG. 8.

Next, an exemplary LCD according to another exemplary embodiment of the present invention will be described with reference to FIGS. 9 and 10.

Figure 9:
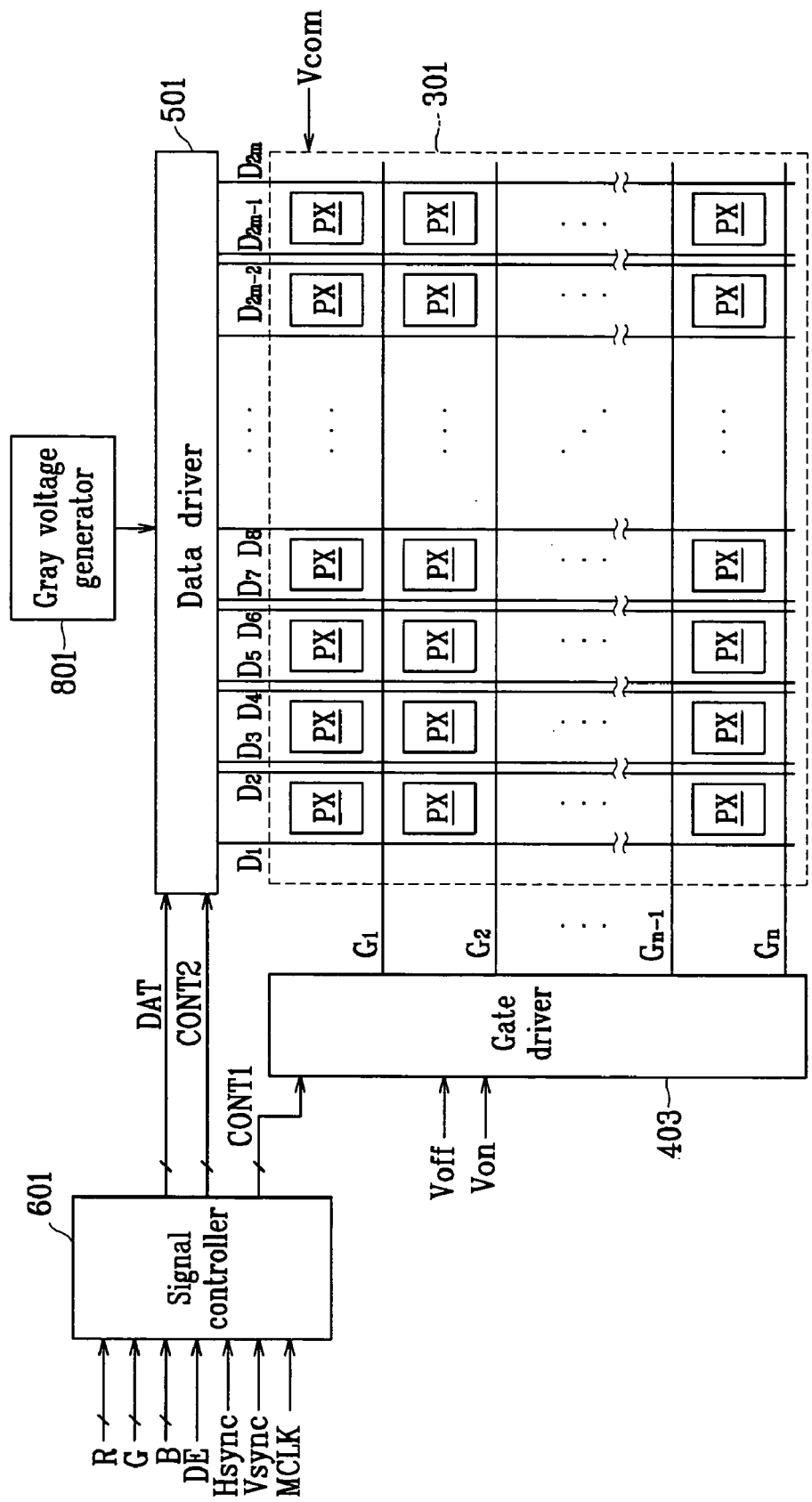
FIG. 9 is a block diagram of an exemplary LCD according to another exemplary embodiment of the present invention.
Figure 10:
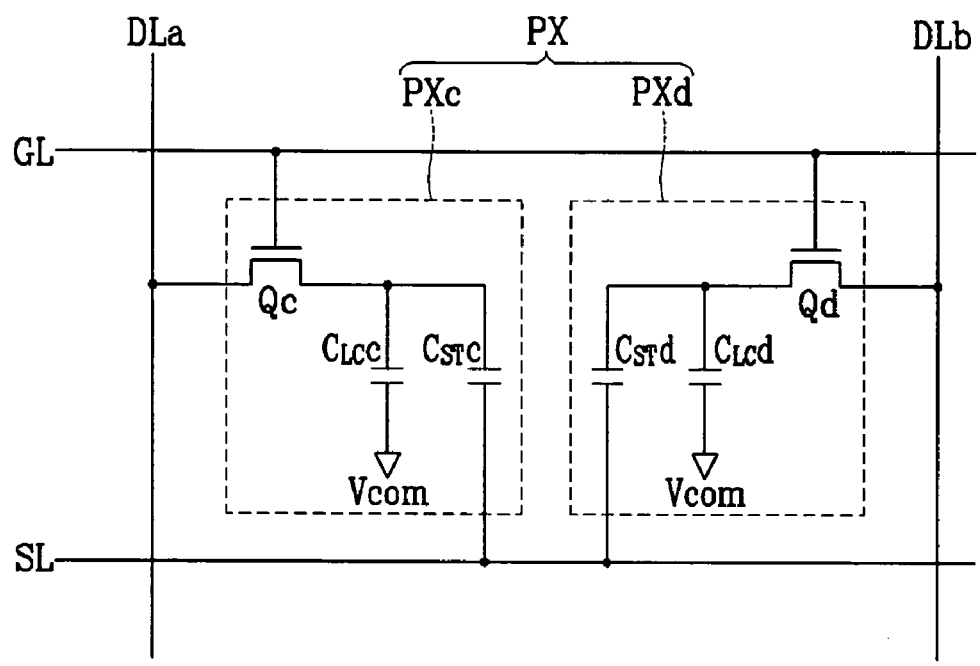
FIG. 10 is an equivalent circuit diagram of an exemplary pixel of the exemplary LCD shown in FIG. 9.

FIG. 9 is a block diagram of an exemplary LCD according to another exemplary embodiment of the present invention, and FIG. 10 is an equivalent circuit diagram of an exemplary pixel of the exemplary LCD shown in FIG. 9.

Referring to FIG. 9, an LCD includes an LC panel assembly 301, a gate driver 403 and a data driver 501 that are connected to the LC panel assembly 301, a gray voltage generator 801 that is connected to the data driver 500, and a signal controller 601 for controlling the above elements.

Referring to FIG. 9, the LC panel assembly 301 includes a plurality of signal lines $G_1$ to $G_n$ and $D_1$ to $D_{2m}$ and a plurality of pixels PX connected thereto and arranged substantially in a matrix.

The signal lines $G_1$ to $G_n$ and $D_1$ to $D_{2m}$ include a plurality of gate lines $G_1$ to $G_n$ for transmitting gate signals (also referred to as "scanning signals"), and a plurality of data lines $D_1$ to $D_{2m}$ for transmitting data signals. The gate lines $G_1$ to $G_n$ extend substantially in a row direction, a first direction, and substantially parallel to each other, while the data lines $D_1$ to $D_{2m}$ extend substantially in a column direction, a second direction, and substantially parallel to each other. The first direction may be substantially perpendicular to the second direction. A pair of data lines from the set of data lines $D_1$ to $D_{2m}$ is disposed on opposite sides of each pixel PX, respectively. The signal lines may further includes a plurality of storage lines SL extending substantially parallel to the gate lines $G_1$ to $G_n$.

FIG. 10 illustrates the display signal lines and an equivalent circuit at one pixel PX. The display signal lines include a gate line indicated by GL, a pair of data lines indicated by DLa and DLb, and a storage electrode line SL. The storage electrode line SL extends substantially parallel to the gate line GL.

Each pixel PX includes a pair of sub-pixels PXc and PXd, and the sub-pixels PXc/PXd include switching elements Qc/Qd that are connected to the gate line GL and the data lines DLa/DLb, LC capacitors $C_{LC}c/C_{LC}d$ that are connected to the switching elements Qc/Qd, and storage capacitors $C_{ST}c/C_{ST}d$, respectively. The storage capacitors $C_{ST}c/C_{ST}d$ are connected to the switching elements Qc/Qd and the storage electrode line SL.

The switching elements Qc/Qd have input terminals that are connected to the data lines DLa/DLb, respectively, and each have a control terminal that is connected to the gate line GL. Otherwise, each sub-pixel PXc and PXd is substantially the same as that shown in FIG. 3, and detail descriptions of the sub-pixels PXc and PXd are omitted.

The gray voltage generator 801 generates two sets of a plurality of gray voltages related to the transmittance of the sub-pixels PXc and PXd. The voltages in one set have a positive polarity with respect to the common voltage Vcom, while those in the other set have a negative polarity with respect to the common voltage Vcom.

The gate driver 403 is connected to the gate lines $G_1$ to $G_n$ of the LC panel assembly 301, and synthesizes the gate-on voltage Von and the gate-off voltage Voff to generate gate signals for application to the gate lines $G_1$ to $G_n$.

The data driver 501 is connected to the data lines $D_1$ to $D_{2m}$ of the LC panel assembly 301, and applies data voltages selected from the gray voltages supplied from the gray voltage generator 801 to the sub-pixels PXc and PXd through the data lines $D_1$ to $D_{2m}$.

The signal controller 601 controls the gate driver 403 and the data driver 501.

The structure of the exemplary LCD according to the exemplary embodiment of the present invention shown in FIGS. 9 and 10 will be further described with reference to FIGS. 11 to 12.

Figure 11:
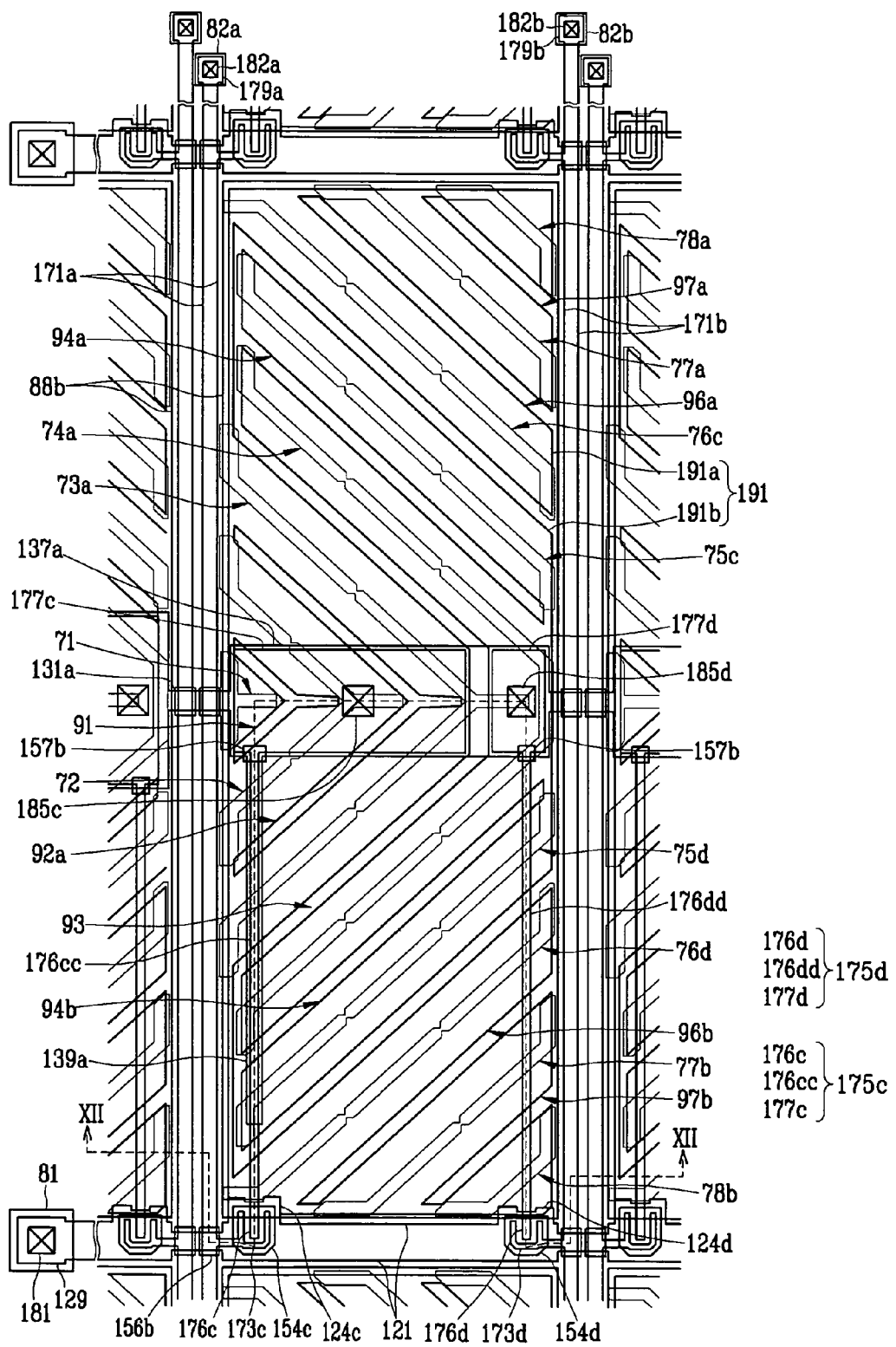
FIG. 11 is a layout view of the exemplary LCD shown in FIG. 9.
Figure 12:
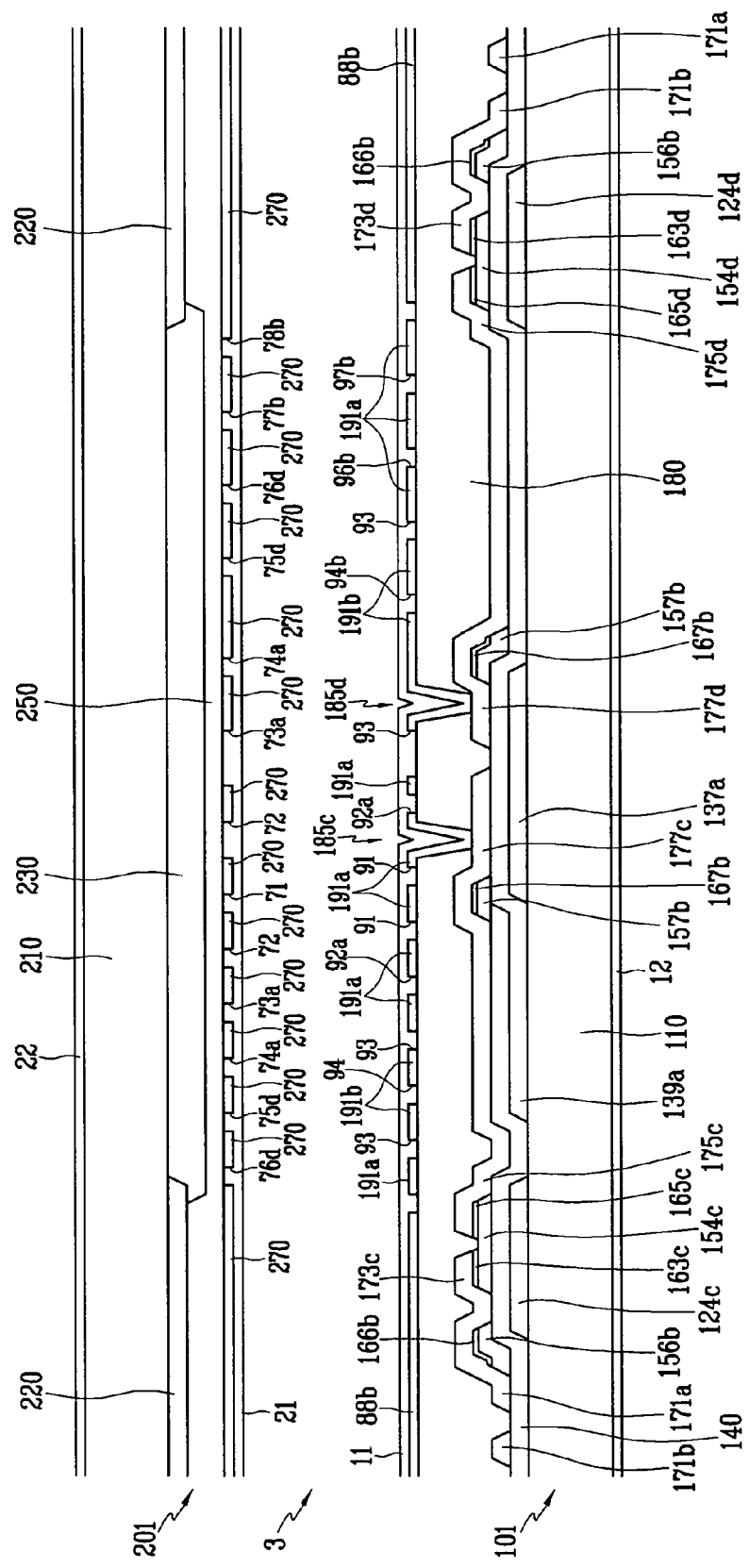
FIG. 12 is a sectional view of the exemplary LCD shown in FIG. 11 taken along line XII-XII.

FIG. 11 is a layout view of the exemplary LCD shown in FIG. 9, and FIG. 12 is a sectional view of the exemplary LCD shown in FIG. 11 taken along line XII-XII.

As shown in FIGS. 11 to 12, the LCD includes a TFT array panel 101, a common electrode panel 201 facing the TFT array panel 101, and a liquid crystal layer 3 disposed between the panels 101 and 201.

First, the TFT array panel 101 will be described.

A plurality of gate lines 121 and a plurality of storage electrode lines 131a are formed on an insulating substrate 110 made of a material such as, but not limited to, transparent glass or plastic.

The gate lines 121 transmit gate signals and extend substantially in a transverse direction, the first direction. Each of the gate lines 121 includes a plurality of first and second gate electrodes 124c and 124d projecting upward, towards the pixel PX to which they are associated, and an end portion 129 having a large area for contact with another layer or an external driving circuit, such as the gate driver 403. In the illustrated embodiment, the first and second gate electrodes 124c and 124d are disposed on opposing sides of the pixel PX.

The storage electrode lines 131a are supplied with a predetermined voltage and extend substantially in a transverse direction, the first direction, substantially parallel to the gate line 121.

Each storage electrode line 131a is disposed between two adjacent gate lines 121, and nearly equidistant from the two adjacent gate lines 121. Each storage electrode line 131a includes a plurality of storage electrodes 137a expanding upward and downward, towards the gate line 121 to which the pixel PX is connected and towards a gate line adjacent the pixel PX but not connected to the pixel PX. A plurality of bar-shaped extensions 139a extends longitudinally downward from the storage electrodes 137a, towards the gate line 121 to which the pixel PX is connected.

The storage electrodes 137a are substantially rectangular-shaped to be symmetrical to the storage electrode lines 131a and the extensions 139a extend to near the first gate electrodes 124c. While particular shapes and arrangements are illustrated, in alternative embodiments, the storage electrode lines 131a as well as the storage electrodes 137a and extensions 139a may have various shapes and arrangements.

A gate insulating layer 140 preferably made of, but not limited to, silicon nitride (SiNx) or silicon oxide (SiOx) is formed on the gate lines 121 and the storage electrode lines 131a, as well as on exposed portion of the insulating substrate 110.

A plurality of semiconductor islands 154c, 154d, 156b, 157b preferably made of hydrogenated a-Si or polysilicon are formed on the gate insulating layer 140. The semiconductor islands 154c and 154d are disposed on the gate electrodes 124c and 124d, respectively. The semiconductor islands 156b and 157b cover edges of the gate lines 121 and the storage electrode lines 131a.

A plurality of pairs of ohmic contact islands 163c, 163d, 165c, 165d, 166b, and 167b are formed on the semiconductor islands 154c, 154d, 156b, and 157b. The ohmic contacts 163c, 163d, 165c, 165d, 166b, and 167b are preferably made of n+ hydrogenated a-Si heavily doped with an n-type impurity such as phosphorous, or they may be made of silicide. A pair of the first ohmic contacts 163c and 163d and a pair of the second ohmic contacts 165c and 165d are placed on the semiconductors 154c and 154d, respectively, and are spaced from each other forming a channel on the semiconductors 154c and 154d. The ohmic contacts 166b and 167b are placed on the semiconductors 156b and 157b, respectively.

A plurality of data lines 171a and 171b and a plurality of pairs of first and second drain electrodes 175c and 175d are formed on the ohmic contacts 163c, 163d, 165c, 165d, 166b, and 167b and the gate insulating layer 140.

The data lines 171a and 171b transmit data signals and extend substantially in the longitudinal direction, the second direction, to intersect the gate lines 121 and the storage electrode lines 131a. Each data line 171a and 171b includes a plurality of source electrodes 173c and 173d projecting toward the gate electrodes 124c and 124d, respectively, and end portions 179a and 179b having a large area for contact with another layer or an external driving circuit, such as the data driver 501.

The first and second drain electrodes 175c and 175d are separated from each other and from the data lines 171a and 171b.

Each of the first and second drain electrodes 175c and 175d includes expansions 177c and 177d overlapping the storage electrode 137a and having a rectangular-shaped large area, bar-shaped end portions 176c and 176d opposite to the expansions 177c and 177d and facing the source electrodes 173c and 173d with respect to the first gate electrodes 124c and 124d, and connections 176cc and 176dd connecting the expansions 177c and 177d to the end portions 176c and 176d, respectively.

The expansions 177c and 177d overlap the storage electrode 137a and the end portions 176c and 176d overlap the gate electrodes 124c and 124d and are partly enclosed by the source electrodes 173c and 173d that are curved like the character U, respectively. The connection 176cc of the first drain electrode 175c is mainly disposed on the extension 139a to extend parallel thereto and is disposed within a vertical boundary thereof, such that the extension 139a has a greater width than a width of the connection 176cc. The area of the expansion 177d of the second drain electrode 175d is smaller than the area of the expansion 177c of the first drain electrode 175c.

The first/second gate electrodes 124c/124d, the first/second source electrodes 173c/173d, and the first/second drain electrodes 175c/175d along with the semiconductors 154c/154d form first/second TFTs Qc/Qd having channels formed in the semiconductor islands 154c/154d disposed between the source electrodes 173c/173d and the drain electrodes 175c/175d, respectively.

The ohmic contacts 163c, 163d, 165c, 165d, 166b, and 167b are interposed only between the underlying semiconductors 154c, 154d, 156b, and 157b and the overlying data lines 171a and 171b and drain electrodes 175c and 175d thereon and reduce the contact resistance therebetween. The semiconductor islands 154c and 154d include some exposed portions, which are not covered with the data lines 171a and 171b and the drain electrodes 175a and 175b, such as portions located between the source electrodes 173c and 173d and the drain electrodes 175c and 175d, and between the ohmic contacts 163c, 163d, and 165c, 165d, respectively. The semiconductors 156b and 157b smooth the profile of the surface of the gate lines 121 and the storage electrode lines 131a, thereby preventing disconnection of the data lines 171a and 171b and the drain electrodes 175c and 175d.

A passivation layer 180 is formed on the data lines 171a and 171b and the drain electrodes 175c and 175d, and on the exposed portions of the semiconductor islands 154c and 154d, as well as on the exposed portions of the gate insulating layer 140.

The passivation layer 180 has a plurality of contact holes 185c, 185d, 182a, and 182b exposing the expansions 177c and 177d of the drain electrodes 175c and 175d, and the end portions 179a and 179b of the data lines 171a and 171b, respectively. The passivation layer 180 and the gate insulating layer 140 have a plurality of contact holes 181 exposing the end portions 129 of the gate lines 121.

A plurality of pixel electrodes 191 having first and second sub-pixel electrodes 191a and 191b, a shield electrode 88b, and a plurality of contact assistants 81, 82a, and 82b are formed on the passivation layer 180.

A pair of sub-pixel electrodes 191a and 191b forming a pixel electrode 191 engage with each other with respect to a gap 93, and the outer boundary of the pixel electrode 191 has a substantially rectangular shape. The second sub-pixel electrode 191b is approximately a rotated equilateral trapezoid, the base thereof being dented, such as at an area corresponding to the storage electrode line 131a, and is mainly surrounded by the first sub-pixel electrode 191a. The first sub-pixel electrode 191a has an upper trapezoid, a lower trapezoid, and a center trapezoid connected to each other at a left side.

The center trapezoid of the first sub-pixel electrode 191a is fitted into the dented base of the second sub-pixel electrode 191b.

The gap 93 between the first sub-pixel electrode 191a and the second sub-pixel electrode 191b has approximately a uniform width and includes two pairs of upper and lower oblique portions, and three longitudinal portions having substantially uniform widths. For explanatory convenience, the gap 93 will also be referred to as a cutout.

The first sub-pixel electrode 191a has cutouts 96a, 96b, 97a, and 97b extending from the top side of the upper trapezoid and the bottom side of the lower trapezoid to each right side thereof, respectively. The first sub-pixel electrode 191a also includes cutouts 91 and 92a which include a transverse portion and a pair of oblique portions connected thereto. The transverse portion extends shortly along an imaginary center transverse line of the first sub-pixel electrode 191a, and the oblique portions make an angle of about 45 degrees with the storage electrode line 131a. The second sub-pixel electrode 192b has cutouts 94a and 94b extending from the left side to the right side of the pixel electrode 191. The cutouts 91, 92a, 94a, 94b, 96a, 96b, 97a, and 97b substantially have inversion symmetry with respect to the storage electrode line 131a. The cutouts 91, 92a, 94a, 94b, 96a, 96b, 97a, and 97b make an angle of about 45 degrees with respect to the gate line 121, and the cutouts on an upper portion of the pixel electrode 191 extend substantially perpendicular to the cutouts on a lower portion of the pixel electrode 191.

The upper half and the lower half of the pixel electrode 191 are partitioned into eight partitions by the cutouts 91 to 97b, respectively.

The first/second sub-pixel electrodes 191a/191b are physically and electrically connected to the first/second drain electrodes 175c and 175d through the contact holes 185c and 185d such that the first and second sub-pixel electrodes 191a and 191b receive data voltages from the first/second drain electrodes 175c/175d via the expansions 177c/177d, respectively. A pair of the sub-pixel electrodes 191a and 191b is supplied with different predetermined data voltages based on an input image signal, respectively, and the magnitudes of the data voltages may be determined depending upon the sizes and shape of the sub-pixel electrodes 191a and 191b. Furthermore, the areas of the sub-pixel electrodes 191a and 191b may differ from each other. For instance, the second sub-pixel electrode 191b receives a voltage that is higher than that of the first sub-pixel electrode 191a, and is smaller in area than the first sub-pixel electrode 191a.

The sub-pixel electrodes 191a and 191b supplied with the data voltages and the common electrode 270 of the common electrode panel 200 supplied with a common voltage form first and second LC capacitors $C_{LC}c$ and $C_{LC}d$, which store applied voltages after the TFT turns off. Each of the LC capacitors $C_{LC}c$ and $C_{LC}d$ includes the LC layer 3 as a dielectric.

The first and second sub-pixel electrodes 191a and 191b and the expansions 177c and 177d connected thereto overlap a storage electrode line 131a including a storage electrode 137a and an extension 139a. The first and second sub-pixel electrodes 191a and 191b and the expansions 177c and 177d connected thereto and the storage electrode line 131a form additional storage capacitors $C_{ST}c$ and $C_{ST}d$, which enhance the voltage storing capacity of the LC capacitors $C_{LC}c$ and $C_{LC}d$, respectively.

The shielding electrode 88b is supplied with the common voltage, and it includes longitudinal portions extending along the data lines 171a and 171b and transverse portions extending along the gate lines 121. The longitudinal portions fully cover the data lines 171a and 171b, and the transverse portions fully cover the gate lines 121 and connect adjacent longitudinal portions. The shielding electrode 88b blocks electric fields generated between the data lines 171a and 171b and the pixel electrodes 191 and between the data lines 171a and 171b and the common electrode 270 to reduce distortion of the voltage of the pixel electrode 191 and signal delay of the data voltages transmitted by the data lines 171a and 171b.

The contact assistants 81, 82a, and 82b are connected to the end portions 129 of the gate lines 121 and the end portions 179a and 179b of the data lines 171a and 171b through the contact holes 181, 182a, and 182b, respectively. The contact assistants 81, 82a, and 82b protect the end portions 129, 179a, and 179b and enhance the adhesion between the end portions 129, 179a, and 179b and external devices.

A description of the common electrode panel 201 follows.

A light blocking member 220, a plurality of color filters 230, an overcoat 250, and a common electrode 270 are sequentially formed on an insulating substrate 210 made of a material such as, but not limited to, transparent glass or plastic.

The common electrode 270 has a plurality of sets of cutouts 71, 72, 73a, 74a, 75c, 75d, 76c, 76d, 77a, 77b, 78a, and 78b.

A set of cutouts 71 to 78b face a pixel electrode 191 and include center cutouts 71, 72, 73a, and 74a, upper cutouts 75c, 76c, 77a, 78a, and lower cutouts 75d, 76d, 77b, 78b. Each of the cutouts 71 to 78b is disposed on the common electrode 270 with respect to a center of the left edge of the pixel electrode 191, with respect to a location between adjacent cutouts 91 to 97b of the pixel electrode 191, or with respect to a location between a cutout 97a or 97b and a chamfered edge of the pixel electrode 191. In addition, each of the cutouts 72 to 78b has at least an oblique portion extending parallel to the cutout 91 to 97b of the pixel electrode 191.

Each of the lower and the upper cutouts 75c to 78b includes an oblique portion, and a pair of transverse and longitudinal portions. The oblique portion extends along the common electrode 270 corresponding to approximately from a right edge to an upper edge or lower edge of the pixel electrodes 191. The transverse and longitudinal portions extend from respective ends of the oblique portion along portions of the common electrode 270 corresponding to edges of the pixel electrode 191, overlapping the edges of the pixel electrode 191, and making obtuse angles with the oblique portion.

The center cutout 71 includes a longitudinal portion overlapping and extending the left edges thereof along portions of the common electrode 270 corresponding to left edges the pixel electrode 191 and a transverse portion extending from the center of the longitudinal portion along portions of the common electrode 270 corresponding to the storage electrode line 131a.

Each of the center cutouts 72 and 73a includes a central transverse portion, a pair of oblique portions, and a pair of terminal longitudinal portions. The central transverse portion extends on the common electrode 270 corresponding to approximately from a center or the right edge of the pixel electrode 191a along the storage electrode line 131. The oblique portions extend from an end of the central transverse portion approximately to a portion of the common electrode 270 corresponding to the left edge of the pixel electrode 191 and make oblique angles with the storage electrode line 131a. The terminal longitudinal portions extend from the ends of the respective oblique portions along portions of the common electrode 270 corresponding to the left edge of the pixel electrode 191, overlapping the left edge of the pixel electrode 191, and making obtuse angles with the respective oblique portions.

The center cutout 74a includes a longitudinal portion, a pair of oblique portions, and a terminal longitudinal portion. The longitudinal portion extends along portions of the common electrode 270 corresponding to the right edge of the pixel electrode 191, overlapping the left edge of the pixel electrode 191. The oblique portions extend from an end of the longitudinal portion approximately to portions of the common electrode 270 corresponding to the left edge of the pixel electrode 191. The terminal longitudinal portions extend from the ends of the respective oblique portions along portions of the common electrode 270 corresponding to the left edge of the pixel electrode 191, overlapping the left edge of the pixel electrode 191, and making obtuse angles with the respective oblique portions.

The oblique portions of the cutouts 72 to 77b include triangular-shaped notches. Alternatively, the notches may be formed in the shape of a rectangle, a trapezoid, or a semicircle, or they may be concave or convex.

Alignment layers 11 and 21 are coated on inner surfaces of the panels 101 and 201, and polarizers 12 and 22 are provided on outer surfaces of the panels 101 and 201.

The display operations of the LCD according this embodiment of the present invention may be substantially the same as those of the LCDs shown in FIGS. 1A to 1C, and a description of the display operations is therefore omitted.

As will be further described below, the magnitudes of the kickback voltages Vkc and Vkd of the first and second sub-pixels PXc and PXd of the LCD according to this exemplary embodiment of the present invention are substantially equal to each other.

The capacitance of the LC capacitors $C_{LC}c$ and $C_{LC}d$ of the first and second sub-pixel PXc and PXd is defined by the areas of the first and second sub-pixel electrodes 191a and 191b. For example, the first sub-pixel electrode 191a may have a larger area than the second sub-pixel electrode 191b. Therefore, when the magnitudes of the voltages applied to the first and second sub-pixel electrodes 191a and 191b are substantially equal to each other, the capacitance of the first LC capacitor $C_{LC}c$ is larger than that of the second LC capacitor $C_{LC}d$. In addition, the area of the expansion 177c of the first drain electrode 175c overlapping the storage electrode 137a is larger than the area of the expansion 177d of the second drain electrode 175d. However, the first LC capacitor $C_{LC}c$ of the first sub-pixel electrode 191a mostly operating at low grays has a lower dielectric constant that is defined by the orientation of the LC molecules than that of the second LC capacitor $C_{LC}d$ of the second sub-pixel electrode 191b mostly operating at upper grays, so that the capacitance of the first LC capacitor $C_{LC}c$ is decreased and the capacitance of the second LC capacitor $C_{LC}d$ is increased.

Accordingly, when the capacitance of the LC capacitors $C_{LC}c$ and $C_{LC}d$ of the first and second sub-pixel electrodes 191a and 191b is fixed, the magnitude of the kickback voltage Vkc of the first sub-pixel electrode 191a is larger than the magnitude of the kickback voltage Vkd of the second sub-pixel electrode 191b. As a result, for equilibrating the kickback voltages Vkc and Vkd, the capacitance of the first and second storage capacitors $C_{ST}c$ and $C_{ST}d$ should be adjusted.

To increase the capacitance of the storage capacitor $C_{ST}c$ for preventing increments of the kickback voltage Vkc, the extensions 139a of the storage electrode 137a that is overlapped by the connection 176cc of the first drain electrode 175c should be further formed or the vertical width of the expansion 177c of the first drain electrode 175c and the storage electrode 137a overlapped by the expansion 177c should be enlarged. Since the magnitudes of the kickback voltages Vkc and Vkd of the first and second sub-pixels PXc and PXd are substantially equal to each other, the optimal magnitude of the common voltage Vcom is defined and the kickback voltages Vkc and Vkd also equilibrate, and thereby a flicker phenomenon is prevented.

As shown in FIGS. 11 and 12, the storage capacitor $C_{ST}c$ is further formed by the extension 139a of the storage electrode 137a overlapped by the connection 176cc of the first drain electrode 175c, so that sufficient storage capacitance of the storage capacitors is ensured even though the area of the storage electrode 137a is decreased and the aperture ratio is also increased since the area of the storage electrode 137a overlapped by the expansion 177c need not be enlarged.

In addition, the widths of the expansion 177d disposed at a right portion of the pixel PX of the second drain electrode 175d and the portion of the storage electrode 137a overlapped by the expansion 177d may become more narrow, thereby further decreasing the capacitance of the storage capacitor $C_{ST}d$. Therefore, on application of a voltage to the second sub-pixel electrode 191b, which is larger than that applied to the first sub-pixel electrode 191a, the decrease of the kickback voltage Vkd is compensated, thereby preventing the flicker phenomenon and the decrease of the aperture ratio.

Various characteristics based on the TFT array panel shown in FIGS. 1 to 8 may be applied to the TFT array panel shown in FIGS. 9 to 12.

Figure 13A:
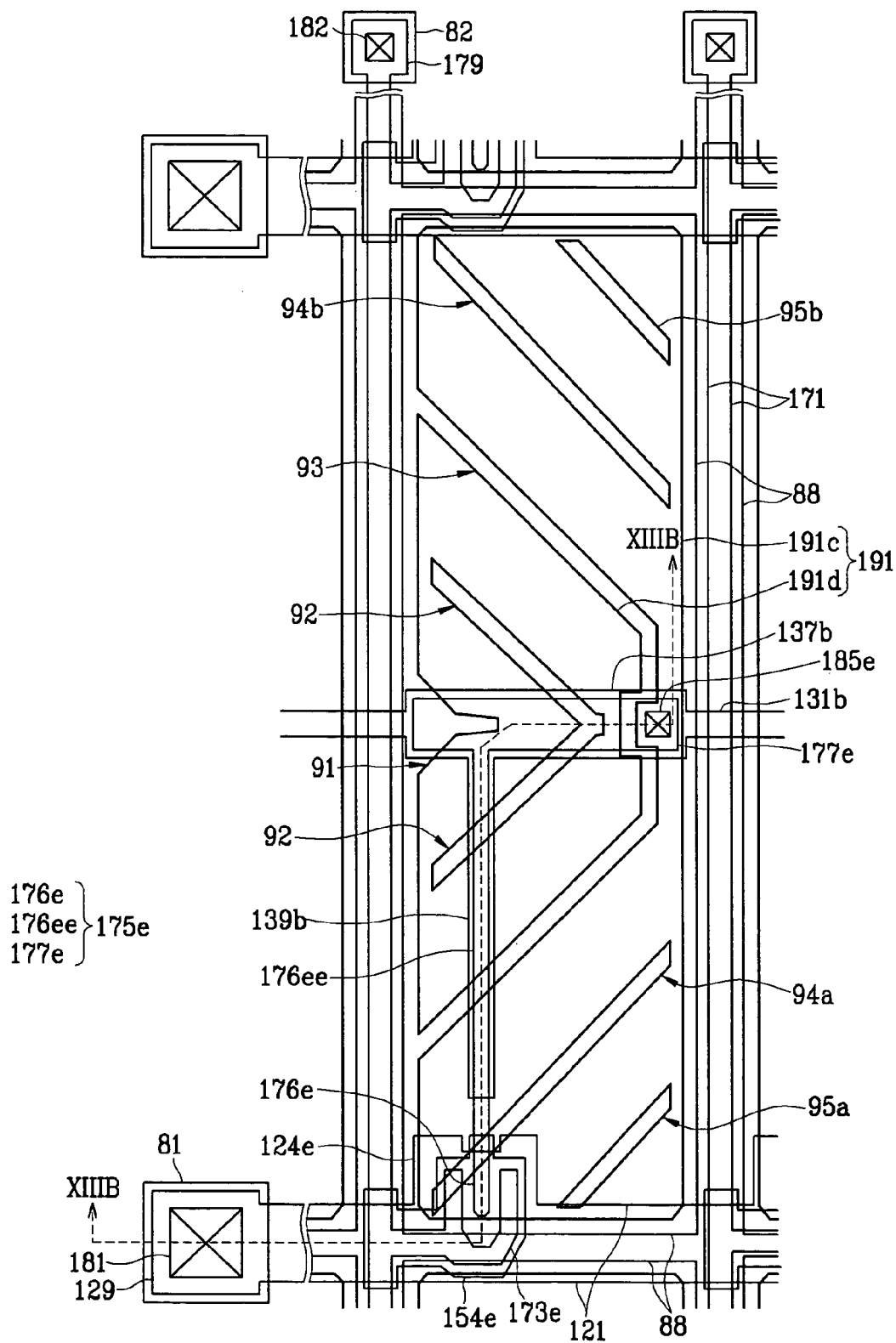
FIG. 13A is a layout view of an exemplary TFT array panel for an exemplary LCD according to another exemplary embodiment of the present invention.
Figure 13B:
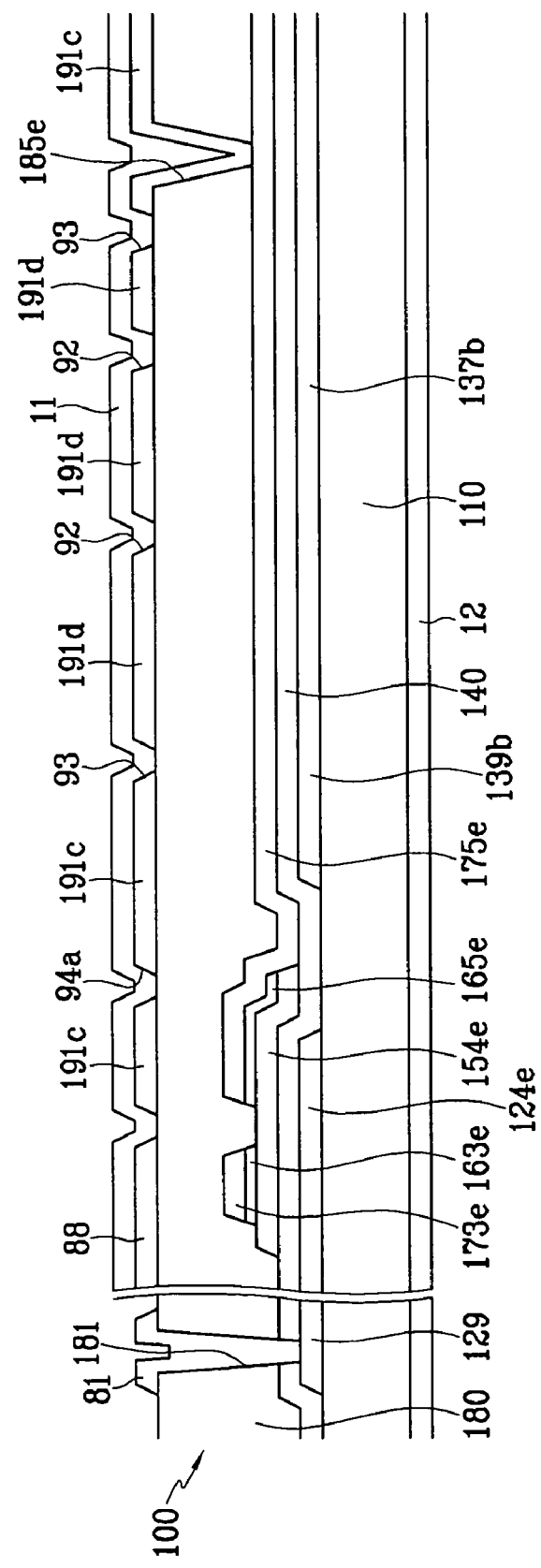
FIG. 13B is a sectional view of the exemplary TFT array panel shown in FIG. 13A taken along line XIIIB-XIIIB.

Referring to FIGS. 13A and 13B, an exemplary LCD according to another exemplary embodiment of the present invention will be described.

FIG. 13A is a layout view of an exemplary TFT array panel for an exemplary LCD according to an exemplary embodiment of the present invention, and FIG. 13B is a sectional view of the exemplary TFT array panel shown in FIG. 13A taken along line XIIIB-XIIIB.

A plurality of gate lines 121 and a plurality of storage electrode lines 131b are formed on an insulating substrate 110 made of a material such as, but not limited to, transparent glass or plastic.

The gate lines 121 transmit gate signals and extend substantially in a transverse direction, the first direction. Each of the gate lines 121 includes a plurality of gate electrodes 124e projecting upward towards the pixel to which it is connected and an end portion 129 having a large area for contact with another layer or an external driving circuit, such as a gate driver, and arranged at the left side thereof, although the end portion 129 may be alternatively arranged at the right side thereof.

The storage electrode lines 131b are supplied with a predetermined voltage and extend substantially in a transverse direction, the first direction, and substantially parallel to the gate lines 121.

Each storage electrode line 131b is disposed between two adjacent gate lines 121 and is positioned nearly equidistant from two adjacent gate lines 121. Each storage electrode line 131b includes a plurality of storage electrodes 137b expanding upward and downward towards the gate line 121 and towards the adjacent gate line 121, and a plurality of bar-shaped extensions 139b longitudinally extending downward toward the gate line 121 from the storage electrodes 137b.

The storage electrodes 137b are substantially rectangular-shaped to be symmetrical to the storage electrode lines 131b, and the extensions 139b extend to near the gate electrodes 124e.

While particular shapes and arrangements are illustrated, the storage electrode lines 131b as well as the storage electrodes 137b and extensions 139b may have various shapes and arrangements within the scope of these embodiments.

A gate insulating layer 140, preferably made of, but not limited to, silicon nitride (SiNx) or silicon oxide (SiOx), is formed on the gate lines 121 and the storage electrode lines 131b, and may be further formed on exposed portions of the insulating substrate 110.

A plurality of semiconductor islands 154e preferably made of hydrogenated a-Si or polysilicon are formed on the gate insulating layer 140. The semiconductor islands 154e are disposed on the gate electrodes 124e.

The semiconductor islands 154e extend to the boundary of the gate lines 121, and may be disposed on the boundary of the storage electrode lines 131b.

A plurality of pairs of ohmic contact islands 163e and 165e are formed on the semiconductor islands 154e.

A plurality of data lines 171 and a plurality of drain electrodes 175e are formed on the ohmic contacts 163e and 165e and the gate insulating layer 140.

The data lines 171 transmit data signals and extend substantially in the longitudinal direction, the second direction, to intersect the gate lines 121 and the storage electrode lines 131b. Each data line 171 includes a plurality of source electrodes 173e projecting toward and overlapping the gate electrodes 124e, and an end portion 179 having a large area for contact with another layer or an external driving circuit, such as the data driver.

Each of the drain electrodes 175e includes expansions 177e overlapping the storage electrode 137b and having a rectangular-shaped large area, bar-shaped end portions 176e facing the source electrodes 173e with respect to the gate electrodes 124e and opposite to the expansions 177e, and connections 176ee connecting the expansions 177e to the end portions 176e.

Each expansion 177e overlaps the storage electrode 137b, and each end portion 176e overlaps a gate electrode 124e and is partly enclosed by a source electrode 173e curved like a character U. The expansions 177e of the drain electrodes 175e are called "coupling electrodes."

Each connection 176ee of a drain electrode 175e is mainly disposed on an extension 139b to extend parallel to the extension 139b and disposed within a vertical boundary of the extension 139b, such that the connection 176ee has a smaller width than the extension 139b.

The gate electrodes 124e, the source electrodes 173e, and the drain electrodes 175e along with the semiconductors 154e form TFTs having channels formed on the semiconductor islands 154e disposed between the source electrodes 173e and the drain electrodes 175e, respectively.

The ohmic contacts 163e and 165e are interposed only between the underlying semiconductors 154e and the overlying data lines 171 and drain electrodes 175e thereon, and reduce the contact resistance therebetween. The semiconductor islands 154e include some exposed portions that are not covered with the data lines 171e and the drain electrodes 175e, such as portions located between the source electrodes 173e and the drain electrodes 175e, and between the ohmic contacts 163e and 165e, respectively, thus forming the channels of the TFTs. The semiconductors 154e may also smooth the profile of the surface of the gate lines 121, thereby preventing disconnection of the data lines 171.

A passivation layer 180 is formed on the data lines 171 and the drain electrodes 175e and the exposed portions of the semiconductor islands 154e. The passivation layer 180 may be further formed on exposed portions of the gate insulating layer 140.

The passivation layer 180 has a plurality of contact holes 182 and 185e exposing the end portions 179 of the data lines 171 and the coupling electrodes 177e, respectively. The passivation layer 180 and the gate insulating layer 140 have a plurality of contact holes 181 exposing the end portions 129 of the gate lines 121.

A plurality of pixel electrodes 191, a plurality of shield electrodes 88, and a plurality of contact assistants 81 and 82 are formed on the passivation layer 180.

Each pixel electrode 191 approximates a rectangle that has four chamfered corners. The chamfered corners of the pixel electrode 191 make an angle of about 45 degrees with respect to the gate lines 121. The pixel electrodes 191 overlap the gate lines 121, to increase the aperture ratio.

A pair of sub-pixel electrodes 191c and 191d forming a pixel electrode 191 engage with each other with respect to a gap 93.

The gap 93 includes a pair of upper and lower oblique portions and longitudinal portions. The upper and lower oblique portions extend from the left edge of the pixel electrode 191 to the right edge of the pixel electrode 191, and the longitudinal portions connect the upper and lower portions. The upper and lower oblique portions make an angle of about 45 degrees with respect to the gate lines 121.

The second sub-pixel electrode 191d is approximately a right angle-rotated equilateral trapezoid and the first sub-pixel electrode 191c includes a pair of trapezoids rotated to a right angle and a longitudinal portion facing the right edge of the second sub-pixel electrode 191d. The trapezoids of the first sub-pixel electrode 191c face the oblique edges of the second sub-pixel electrode 191d, respectively.

The first sub-pixel electrode 191c has lower and upper cutouts 94a, 94b, 95a, and 95b. The lower and upper cutouts 94a and 94b extend from the bottom corner and the top corner of the first sub-pixel electrode 191c to each right side thereof, respectively. The lower and upper cutouts 95a and 95b extend from the bottom side or the top side of the first sub-pixel electrode 191c to each right side thereof, respectively. The lower and upper cutouts 94a, 94b, 95a, and 95b make an angle of about 45 degrees with respect to the gate line 121 and the lower cutouts 94a, 95a extend substantially perpendicular to the upper cutouts 94b, 95b.

The second sub-pixel electrode 191d includes center cutouts 91 and 92. The center cutout 91 has an inlet near the center portion of the left side of the second sub-pixel electrode 191d, and the inlet of the cutout 91 has a pair of inclined edges substantially parallel to the upper oblique portion and the lower oblique portion of the gap 93, respectively.

The cutout 92 has a transverse portion shortly extending in a transverse direction along the center of the storage electrode 137b, and a pair of oblique portions extending approximately parallel to the upper oblique portion and lower oblique portion of the gap 93 from the transverse portions, respectively. For explanatory convenience, the gap 93 will be also referred to as a cutout.

Each of the pixel electrodes 191 are partitioned into six partitions by the cutouts 91 to 95b, respectively. The cutouts 91 to 95b substantially have inversion symmetry with respect to a storage electrode line 131b.

While a particular arrangement is illustrated, the number of partitions or the number of cutouts may be varied in alternative embodiments depending on the design factors such as the size of pixels, the ratio of the transverse edges and the longitudinal edges of the pixel electrode 191, the type and characteristics of the LC layer, and so on.

The polarizer 12 is provided on the outer surface of the panel 100.

The first sub-pixel electrodes 191c are physically and electrically connected to the drain electrodes 175e through the contact holes 185e such that the first sub-pixel electrodes 191c receive data voltages from the drain electrodes 175e via the expansions or coupling electrodes 177e, respectively.

The first and second sub-pixel electrodes 191c and 191d that are supplied with the data voltages and the common electrode (not shown) of the common electrode panel (not shown) that is supplied with a common voltage form first and second LC capacitors $C_{LC}e$ and $C_{LC}f$, which store applied voltages after the TFT turns off.

The first sub-pixel electrodes 191c and the coupling electrodes 177e connected thereto overlap a storage electrode line 131b including a storage electrode 137b. The first sub-pixel electrodes 191c and the coupling electrodes 177e connected thereto as well as the connection 176ee and the storage electrode line 131b including the storage electrode 137b and the extension 139b form storage capacitors $C_{ST}e$ which enhance the voltage storing capacity of the first LC capacitors $C_{LC}e$.

The second sub-pixel electrodes 191d overlap the coupling electrodes 177e, to form coupling capacitors Ccp.

The TFT applies data voltages from a data line 171 to the first LC capacitor $C_{LC}e$ and the coupling capacitor Ccp in response to a gate signal from a gate line 121, and the coupling capacitor Ccp transmits the data voltage with a modified magnitude to the second LC capacitor $C_{LC}f$.

If the storage electrode line 131b is supplied with the common voltage Vcom, and each of the capacitors $C_{LC}e$, $C_{ST}e$, $C_{LC}f$, and Ccp and the capacitance thereof are denoted as the same reference characters, the voltage Vf charged across the second LC capacitor $C_{LC}f$ is given by:

$$Vf = Ve \times [Ccp/(Ccp + C_{LC}f)],$$

where Ve denotes the voltage of the first LC capacitor $C_{LC}e$.

Since the term $Ccp/(Ccp+C_{LC}f)$ is smaller than 1, the voltage Vf of the second LC capacitor $C_{LC}f$ is smaller than the voltage Ve of the first LC capacitor $C_{LC}e$. This inequality may also be true for a case in which the voltage of the storage electrode line 131b is not equal to the common voltage Vcom.

When the potential difference is generated across the first LC capacitor $C_{LC}e$ or the second LC capacitor $C_{LC}f$, an electric field that is substantially perpendicular to the surfaces of the TFT array panel 100 and the common electrode panel (not shown) is generated in the LC layer (not shown).

Then, the LC molecules in the LC layer tilt in response to the electric field such that their long axes are perpendicular to the field direction. The degree of the tilt of the LC molecules determines the variation of the polarization of light incident on the LC layer, and the variation of the light polarization is transformed into the variation of the light transmittance by the polarizers 12. In this way, the LCD displays images.

The tilt angle of the LC molecules depends on the strength of the electric field. Since the voltage Ve of the first LC capacitor $C_{LC}e$ and the voltage Vf of the second LC capacitor $C_{LC}f$ are different from each other, the tilt direction of the LC molecules in the first sub-pixel is different from that in the second sub-pixel, and thus the luminance of the two sub-pixels are different. Accordingly, to maintain the average luminance of the two sub-pixels within a target luminance, the voltages Ve and Vf of the first and second sub-pixels can be adjusted so that an image viewed from a lateral side is close to an image viewed from the front, thereby improving the lateral visibility.

The shielding electrode 88 is supplied with the common voltage, and it includes longitudinal portions extending along the data lines 171 and transverse portions extending along the gate lines 121. The longitudinal portions fully cover the data lines 171, and the transverse portions lie within the boundary of the gate lines 121.

The contact assistants 81 and 82 are connected to the end portions 129 of the gate lines 121 and the end portions 179 of the data lines 171 through the contact holes 181 and 182, respectively.

As shown in FIGS. 13A and 13B, the storage capacitor $C_{ST}e$ is further formed by the extension 139b of the storage electrode 137b overlapped by the connection 176ee of the drain electrode 175e, so that sufficient storage capacitance of the storage capacitor $C_{ST}e$ is ensured even though the area of the storage electrode 137b is decreased, and the aperture ratio is also increased.

Various characteristics based on the TFT array panel shown in FIGS. 1 to 8 may be also applied to the TFT array panel shown in FIGS. 13A and 13B.

Next, an exemplary LCD according to another exemplary embodiment of the present invention will be described with reference to FIGS. 14A and 14B.

Figure 14A:
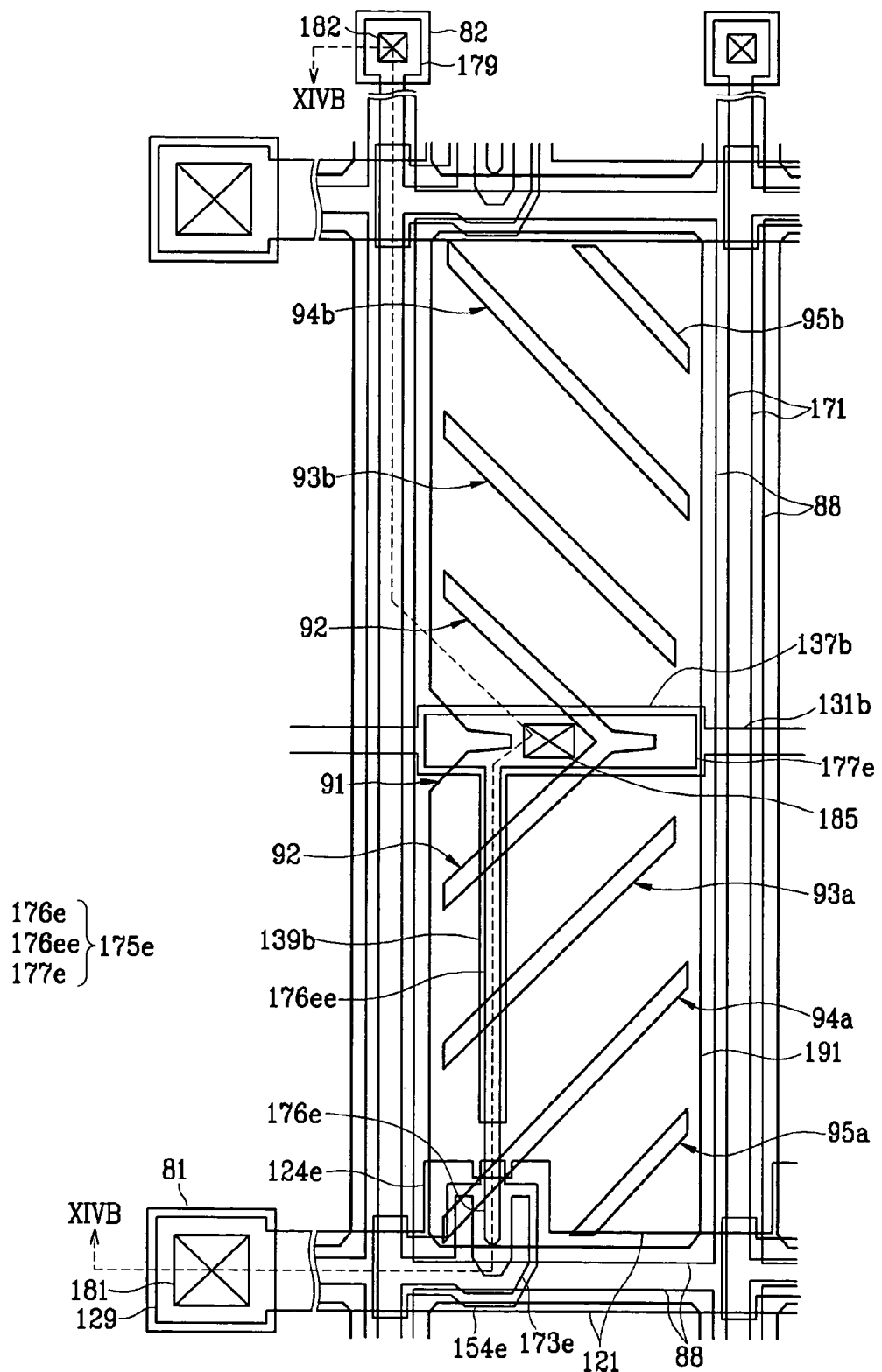
FIG. 14A is a layout view of an exemplary TFT array panel for an exemplary LCD according to another exemplary embodiment of the present invention.
Figure 14B:
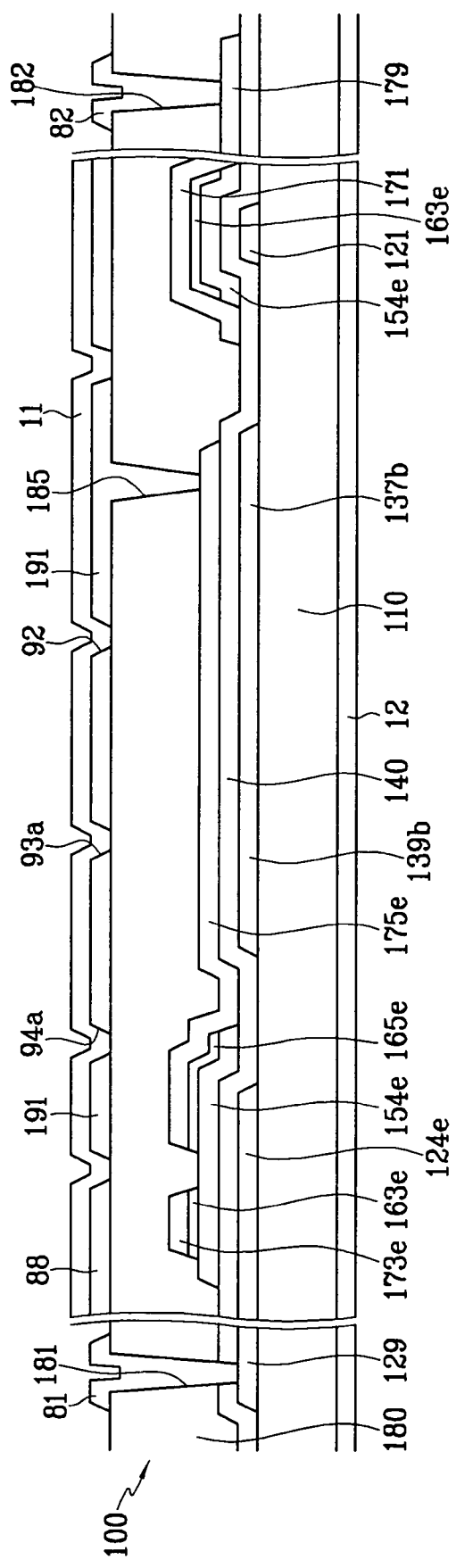
FIG. 14B is a sectional view of the exemplary TFT array panel shown in FIG. 14A taken along line XIVB-XIVB.

FIG. 14A is a layout view of an exemplary TFT array panel for an exemplary LCD according to another exemplary embodiment of the present invention, and FIG. 14B is a sectional view of the exemplary TFT array panel shown in FIG. 14A taken along line XIVB-XIVB.

Referring to FIGS. 14A and 14B, layered structures of the exemplary TFT array panel of the exemplary LCD according this exemplary embodiment are substantially the same as those shown in FIGS. 13A and 13B.

That is, a plurality of gate lines 121 including gate electrodes 124e and end portions 129 and a plurality of storage electrode lines 131b including storage electrodes 137b and extensions 139b are formed on an insulating substrate 110. A gate insulating layer 140, a plurality of semiconductor islands 154e, and a plurality of ohmic contact islands 163e and 165e are sequentially formed on the gate lines 121 and the storage electrode lines 131b and on exposed portions of the substrate 110. A plurality of data lines 171 including source electrodes 173e and end portions 179, and a plurality of drain electrodes 175e including expansions 177e, end portions 176e, and connections 176ee are formed on the ohmic contacts 163e and 165e and the gate insulating layer 140. A passivation layer 180 is formed on the data lines 171, the drain electrodes 175e, and the exposed portions of the semiconductors 154e, as well as on exposed portions of the gate insulating layer 140. A plurality of contact holes 181, 182, and 185 are provided at the passivation layer 180 and the gate insulating layer 140. A plurality of pixel electrodes 191, a plurality of shielding electrodes 88, and a plurality of contact assistants 81 and 82 are formed on the passivation layer 180. A polarizer 12 is provided on an outer surface of the TFT array panel 100.

Differing from the TFT array panel shown in FIGS. 13A and 13B, each pixel electrode 191 is not partitioned into sub-pixel electrodes, and each pixel electrode 191 has center cutouts 91 and 92, lower cutouts 93a, 94a, and 95a, and upper cutouts 93b, 94b, and 95b.

The lower and upper cutouts 93a, 93b, 94a, and 94b obliquely extend from the left edge of the pixel electrode 191 to the right edge of the pixel electrode 191. The lower and upper cutouts 95a and 95b obliquely extend from the bottom side or the top side of the pixel electrode 191 to the right side of the pixel electrode 191, respectively.

The lower and upper cutouts 93a, 93b, 94a, 94b, 95a, and 95b make an angle of about 45 degrees with respect to the gate line 121, and the lower cutouts 93a, 94a, 95a extend substantially perpendicular to the upper cutouts 93b, 94b, 95b.

The center cutout 91 has an inlet near the center portion of the left side of the pixel electrode 191, and the inlet of the cutout 91 has a pair of inclined edges that are substantially parallel to the lower and upper cutouts 93a to 95b, respectively. The cutout 92 has a transverse portion shortly extending in a transverse direction at the center of the storage electrode 137b, and a pair of oblique portions extending approximately parallel to the upper and lower cutouts 93b, 93a from the transverse portions, respectively.

The pixel electrodes 191 are partitioned into a plurality of partitions by the cutouts 91 to 95b, respectively. The cutouts 91 to 95b substantially have inversion symmetry with respect to a storage electrode line 131b.

The pixel electrodes 191 are physically and electrically connected to the drain electrodes 175e through the contact holes 185 such that the pixel electrodes 191 receive data voltages from the drain electrodes 175e.

The pixel electrodes 191 that are supplied with the data voltages and the common electrode (not shown) of the common electrode panel (not shown) that is supplied with a common voltage form LC capacitors $C_{LC}$g, which store applied voltages after the TFT turns off.

The pixel electrodes 191 and the expansions 177e connected thereto overlap a storage electrode line 131b including a storage electrode 137b. The pixel electrodes 191 and the expansions 177e connected thereto and the connections 176ee and the storage electrode lines 131b including the storage electrodes 137b and the extensions 139b form storage capacitors $C_{ST}$g which enhance the voltage storing capacity of the LC capacitors $C_{LC}$g.

The TFT applies data voltages from a data line 171 to the LC capacitor $C_{LC}$g in response to a gate signal from a gate line 121. Then, the LC molecules in the LC layer tilt in response to the electric field such that their long axes are perpendicular to the field direction. The degree of the tilt of the LC molecules determines the variation of the polarization of light incident on the LC layer, and the variation of the light polarization is transformed into the variation of the light transmittance by the polarizers 12. In this way, the LCD displays images.

The tilt directions of the LC molecules are determined by horizontal components of the electric field caused by distortion of the electric field generated by the oblique edges of the cutouts 91 to 95b of the pixel electrodes 191 and cutouts (not shown) of the common electrode panel (not shown), and the horizontal components are perpendicular to edges of the cutouts 91 to 95b and edges of the pixel electrodes 191.

Referring to FIG. 14A, the tilt directions are generally four. Because the LC molecules have various tilt directions, the reference viewing angles of the LCD are increased.

While one exemplary embodiment is illustrated, the shapes and the arrangements of the cutouts 91 to 95b may be modified in alternative embodiments. Also in alternative embodiments, at least one of the cutouts 91 to 95b can be substituted with protrusions (not shown) or depressions (not shown). The protrusions are preferably made of an organic or inorganic material that is disposed on or under the pixel electrode 191 or the common electrode.

As shown in FIGS. 14A and 14B, the storage capacitor $C_{ST}$g is further formed by the extension 139b of the storage electrode 137b overlapping the connection 176ee of the drain electrode 175e, so that even though the area of the storage electrode 137b is decreased and sufficient storage capacitance of the storage capacitors $C_{ST}$g is ensured, the aperture ratio is increased.

Various characteristics based on the TFT array panel shown in any of the previously described embodiments may be applied to the TFT array panel shown in FIGS. 14A and 14B.

Meanwhile, referring to FIGS. 4 to 7B, the characteristic that the storage capacitor $C_{ST}$a is further formed by the extension 139 of the storage electrode 137 overlapping the connection 176aa of the drain electrode 175a, even though the area of the storage electrode 137 is decreased and the aperture ratio increases, is not limited to the above-described embodiments, but may also be used with various panels having a switching element or a plurality of switching elements.

In the present invention, in one exemplary embodiment thereof, one pixel electrode is partitioned into two sub-pixel electrodes that are supplied with different data voltages, so the lateral visibility is improved. In addition, by forming the extension of the storage electrode under the connection of the first drain electrode of the first sub-pixel electrode or adjusting the overlapping areas of the second drain electrode and the storage electrode, the capacitance of the storage capacitors is adjusted based on a capacitance variation of the LC capacitors that are supplied with the different data voltages. Accordingly, the kickback voltages of the two sub-pixel electrodes are equilibrated, and image deterioration such as the flicker phenomenon decreases. Furthermore, by forming the extension of the storage electrode under the connection of the drain electrode, sufficient storage capacitance is ensured and the aperture ratio also increases.

While the present invention has been described in detail with reference to exemplary embodiments, those skilled in the art will appreciate that various modifications and substitutions can be made thereto without departing from the spirit and scope of the present invention as set forth in the appended claims.

What is claimed is:

1. A liquid crystal display comprising:
   a first gate electrode formed on a substrate;
   a storage electrode formed on the substrate and separated from the first gate electrode, the storage electrode having a body and an extension extending from and nonparallel to the body;
   a gate insulating layer formed on the first gate electrode and the storage electrode;
   a first semiconductor formed on the gate insulating layer;
   a first source electrode formed on the first semiconductor;
   a first drain electrode formed on the first semiconductor, separated from the first source electrode, the first drain electrode having an end portion overlapping the first gate electrode, an expansion overlapping the body of the storage electrode and distanced from the end portion, and a connection connecting the end portion and the expansion, the connection overlapping the extension of the storage electrode;

a passivation layer formed on the first source electrode and the first drain electrode and having a contact hole exposing the expansion of the first drain electrode; and a first field-generating electrode connected to the first drain electrode through the contact hole, wherein a width of the extension of the storage electrode is wider than a width of the connection of the first drain electrode.

2. The liquid crystal display of claim 1, wherein a boundary of the expansion of the first drain electrode is disposed within a boundary of the body of the storage electrode, and the extension of the storage electrode is branched from a portion of the body of the storage electrode.

3. The liquid crystal display of claim 1, further comprising a second field-generating electrode formed on the passivation layer and supplied with a voltage that is different from a voltage supplied to the first field-generating electrode.

4. The liquid crystal display of claim 3, wherein the first and second field-generating electrodes are capacitively coupled to each other.

5. The liquid crystal display of claim 3, further comprising:
a second gate electrode;
a second semiconductor formed on the gate insulating layer;
a second source electrode formed on the second semiconductor; and
a second drain electrode formed on the second semiconductor, separated from the second source electrode, and connected to the second field-generating electrode;
wherein the first and second field-generating electrodes are supplied with data voltages having magnitudes that are different from each other and that are obtained from a same input image signal, respectively.

6. The liquid crystal display of claim 5, wherein the second drain electrode overlaps the body of the storage electrode.

7. The liquid crystal display of claim 6, wherein the second drain electrode does not overlap the extension of the storage electrode.

8. The liquid crystal display of claim 6, wherein an overlapping area of the second drain electrode and the body of the storage electrode is smaller than an overlapping area of the first drain electrode and the body of the storage electrode.

9. The liquid crystal display of claim 8, wherein a width of an overlapping portion of the body of the storage electrode and the second drain electrode is narrower than a width of an overlapping portion of the body of the storage electrode and the first drain electrode.

10. The liquid crystal display of claim 8, wherein a length of an overlapping portion of the body of the storage electrode and the second drain electrode is shorter than a length of an overlapping portion of the body of the storage electrode and the first drain electrode.

11. The liquid crystal display of claim 5, wherein a voltage applied to the first field-generating electrode is smaller than a voltage applied to the second field-generating electrode with respect to a predetermined voltage.

12. The liquid crystal display of claim 5, wherein an area of the first field-generating electrode is larger than an area of the second field-generating electrode.

13. The liquid crystal display of claim 5, further comprising:
a first gate line connected to the first gate electrode;
a second gate line connected to the second gate electrode; and
a data line connected to the first and second source electrodes.

14. The liquid crystal display of claim 5, further comprising:
a gate line connected to the first and second gate electrodes;
a first data line connected to the first source electrode; and
a second data line connected to the second source electrode.

15. The liquid crystal display of claim 1, further comprising a storage electrode line extending substantially in a first direction, the storage electrode expanded from the storage electrode line, wherein the extension of the storage electrode extends substantially perpendicular to the first direction.

16. A liquid crystal display comprising:
a storage electrode formed on a substrate, the storage electrode having a body and an extension extending from and nonparallel to the body; and,
a first drain electrode having an end portion, an expansion overlapping the body of the storage electrode, and a connection connecting the end portion and the expansion, the connection overlapping the extension of the storage electrode,
wherein a width of the extension is wider than a width of the connection.

17. The liquid crystal display of claim 16, further comprising a storage electrode line, the storage electrode expanded from the storage electrode line, the extension of the storage electrode and the connection of the first drain electrode extending substantially perpendicular to the storage electrode line.

18. The liquid crystal display of claim 16, wherein a width of the extension is wider than a width of the connection.

19. The liquid crystal display of claim 16, further comprising a second drain electrode having an end portion, an expansion overlapping the body of the storage electrode, and a connection connecting the end portion and the expansion, wherein the connection of the second drain electrode does not overlap an extension of the storage electrode.

20. The liquid crystal display of claim 19, wherein the expansion of the second drain electrode is smaller than the expansion of the first drain electrode.

21. The liquid crystal display of claim 19, wherein the first drain electrode is connected to a first pixel electrode and the second drain electrode is connected to a second pixel electrode, the first pixel electrode having a greater area than the second pixel electrode.

* * * * *